US011710343B2

(12) United States Patent
Nakada

(10) Patent No.: US 11,710,343 B2
(45) Date of Patent: Jul. 25, 2023

(54) IMAGE PROCESSING DEVICE, IMAGE PROCESSING METHOD, AND STORAGE MEDIUM FOR CORRECTING BRIGHTNESS

(71) Applicant: CANON KABUSHIKI KAISHA, Tokyo (JP)

(72) Inventor: Yuichi Nakada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 262 days.

(21) Appl. No.: 17/015,591

(22) Filed: Sep. 9, 2020

(65) Prior Publication Data

US 2021/0075952 A1 Mar. 11, 2021

(30) Foreign Application Priority Data

Sep. 11, 2019 (JP) ................................ 2019-165644

(51) Int. Cl.

| | |
|---|---|
| ***G06V 10/60*** | (2022.01) |
| ***H04N 23/74*** | (2023.01) |
| ***H04N 23/71*** | (2023.01) |
| ***G06V 40/16*** | (2022.01) |
| ***G06V 10/28*** | (2022.01) |
| ***G06V 10/98*** | (2022.01) |

(52) U.S. Cl.

CPC ............ *G06V 40/162* (2022.01); *G06V 10/28* (2022.01); *G06V 10/60* (2022.01); *G06V 10/993* (2022.01); *G06V 40/166* (2022.01); *H04N 23/71* (2023.01); *H04N 23/74* (2023.01)

(58) Field of Classification Search

CPC ...... G06V 40/162; G06V 10/28; G06V 10/60; G06V 10/993; G06V 40/166; H04N 23/71; H04N 23/74; H04N 23/60; H04N 23/76; H04N 5/2354; H04N 5/2351; H04N 5/232; H04N 5/243

See application file for complete search history.

(56) References Cited

U.S. PATENT DOCUMENTS 7,796,159 B2 * 9/2010 Shimizu ................. H04N 23/68 348/208.4
10,146,043 B2 * 12/2018 Arai ....................... H04N 1/401

(Continued)

FOREIGN PATENT DOCUMENTS

JP 2012085093 A 4/2012

*Primary Examiner* — Luong T Nguyen
(74) *Attorney, Agent, or Firm* — Carter, DeLuca & Farrell LLP

(57) ABSTRACT

The image processing unit selects multiple subject areas from strobe-ON image data to be corrected, and, from the selected multiple subject areas, the image processing unit acquires a feature amount such as gloss information corresponding to each subject. Subsequently, from each subject area, the image processing unit selects a part of the subject area, based on the acquired feature amount. Then, regarding the partial area of each subject area, which is selected based on the feature amount, the image processing unit estimates the auxiliary light arrival rate corresponding to each subject, based on a pixel value of the strobe-ON image data and a pixel value of strobe-OFF image data. Thereafter, based on the estimated auxiliary light arrival rate, the image processing unit corrects the brightness of each subject area of the strobe-ON image data, in order to generate corrected image data.

20 Claims, 21 Drawing Sheets

(56) References Cited

U.S. PATENT DOCUMENTS

| | | | | |
|---|---|---|---|---|
| 10,304,164 | B2 | 5/2019 | Nakada | |
| 2019/0066271 | A1* | 2/2019 | Kanbara | H04N 25/533 |
| 2020/0137363 | A1 | 4/2020 | Nakada | |

* cited by examiner $I(i, j) = ( I_r(i, j), I_g(i, j), I_b(i, j) )$ $J(i, j) = ( J_r(i, j), J_g(i, j), J_b(i, j) )$ $D(i, j)$

FACE SPECULAR REFLECTION CHARACTERISTIC TEMPLATE

SPECULAR REFLECTION CHARACTERISTIC MAP

LOW SPECULAR REFLECTION AREA $g_{mr}$

FACE NORMAL TEMPLATE

NORMAL MAP

FRONT-FACE AREA fr

IMAGE PROCESSING DEVICE, IMAGE PROCESSING METHOD, AND STORAGE MEDIUM FOR CORRECTING BRIGHTNESS

BACKGROUND OF THE INVENTION

Field of the Invention

The technology of the present disclosure relates to an image processing technology for correcting the brightness of a subject in a captured image.

Description of the Related Art

For capturing an image in a dark place, there is a case of utilizing an auxiliary light source such as a strobe that emits diffuse light in order to supplement the light to which the subject is exposed. In such a case of utilizing an auxiliary light source for capturing an image, with increase in the distance from the auxiliary light source to the subject, the light diffuses more widely and the amount of light to which the subject is exposed decreases. Therefore, in a case where there are multiple subjects at different distances, the farther a subject is, the less the amount of light from the auxiliary light source becomes, which results in a darker image.

As a method for correcting the brightness of a subject in such a case where an auxiliary light source is utilized, there is a method of correcting the brightness of each subject by use of information of the distance to the subject. As a method for acquiring the information of the distance to the subject, which is utilized for the present correction, a method adopted in the image processing device of Japanese Patent Laid-Open No. 2012-85093 is known. In the image processing device disclosed in Japanese Patent Laid-Open No. 2012-85093, pixel values from which the influence of the reflection characteristics of subjects has been removed are calculated, based on image data obtained by image-capturing with irradiation by an auxiliary light and image data obtained by image-capturing without irradiation by the auxiliary light. Then, based on the calculated pixel values and the characteristic that light attenuates in accordance with distance, information related to the distance to a subject is acquired.

However, for the image processing device disclosed in Japanese Patent Laid-Open No. 2012-85093, it is difficult to accurately acquire information related to the distance to a subject having gloss. As a result, there is a problem that the accuracy of the brightness correction is decreased for a subject having gloss.

SUMMARY OF THE INVENTION

The technology of the present disclosure relates to an image processing device including: an image acquiring unit configured to acquire first image data, which is acquired by image-capturing with an auxiliary light turned on with a first brightness, and second image data, which is acquired by image-capturing with the auxiliary light turned on with a second brightness that is different from the first brightness, for a same scene; an area setting unit configured to set a plurality of subject areas corresponding to a plurality of subjects in the first image data or the second image data; an area selecting unit configured to select a selected area from each of the plurality of subject areas, based on a feature amount related to a reflection characteristic of each of the plurality of subject areas; and a correcting unit configured to correct a pixel value of each of the plurality of subject areas of the first image data or the second image data, based on a pixel value of the selected area in the first image data and the second image data.

Further features of the present invention will become apparent from the following description of exemplary embodiments with reference to the attached drawings.

DESCRIPTION OF THE EMBODIMENTS

<Outer Appearance of the Image Capturing Apparatus>

Figure 1A:
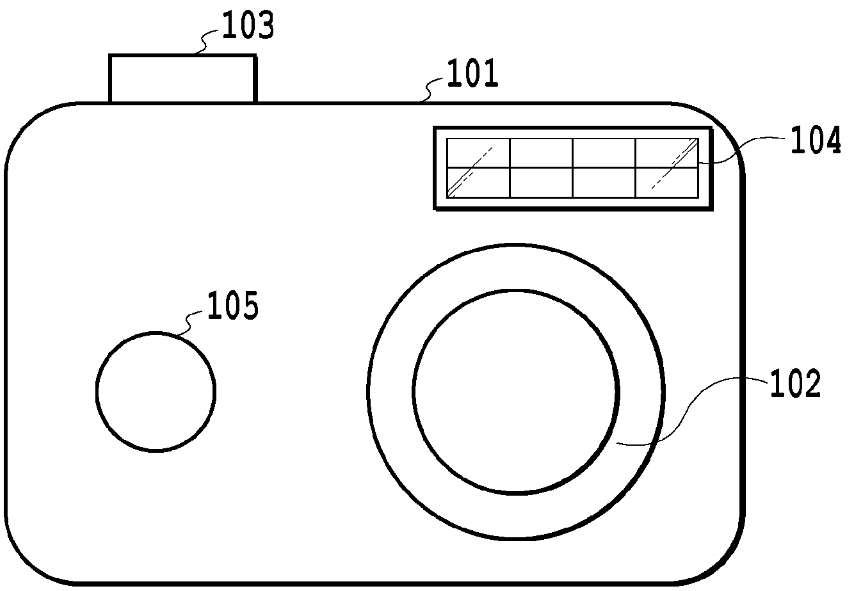
FIG. 1A is a diagram illustrating an outer appearance of an image capturing apparatus including an image processing device according to the first embodiment.
Figure 1B:
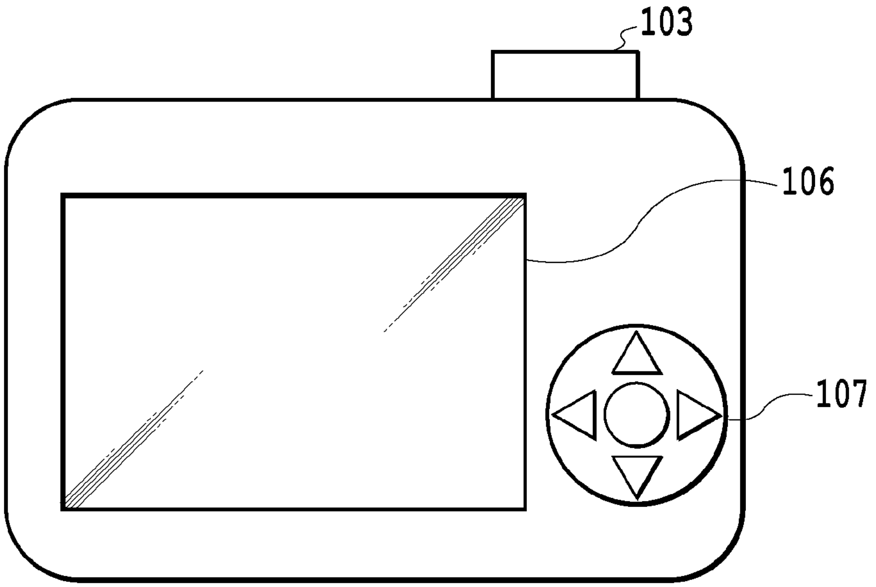
FIG. 1B is a diagram illustrating an outer appearance of the image capturing apparatus including the image processing device according to the first embodiment.

FIGS. 1A and 1B are diagrams illustrating outer appearances of the image capturing apparatus provided with the image processing device according to an embodiment of the technology of the present disclosure. In FIG. 1A, the front face of the image capturing apparatus is illustrated, and, in FIG. 1B, the rear face of the image capturing apparatus is illustrated. The image capturing apparatus 101 includes an optical unit 102, an image capturing button 103, a strobe 104, which is an auxiliary light source, a distance image acquiring unit 105, a display unit 106, and an operation button 107.

The optical unit 102 is a lens barrel that is configured with a zoom lens, a focus lens, a shake correction lens, an aperture, and a shutter, and the optical unit 102 focuses light from a subject.

The image capturing button 103 is a button mainly for the user to instruct the image capturing apparatus 101 to start image capturing. In addition, the image capturing button 103 can also be used as one of the buttons for performing various kinds of settings, as with the operation button 107.

The strobe 104 is a lamp that can be controlled to emit light at the timing of start of image capturing. Although the image capturing apparatus 101 includes the built-in strobe 104 in FIG. 1A, it is also possible that the strobe 104 is externally attached, and, as long as the strobe 104 operates in synchronization with an instruction by the image capturing button 103 for starting image capturing, the strobe 104 need not be attached to the image capturing apparatus 101.

The distance image acquiring unit 105 acquires distance image data of the subject in response to an instruction for image capturing. Here, it is meant that the distance image data is image data in which, as the pixel value of each pixel of the image, distance information indicating the distance to the subject corresponding to the pixel is stored. The distance image acquiring unit 105 includes an infrared light emitting unit that emits infrared light and a light receiving unit that receives infrared light reflected by the subject. The distance image acquiring unit 105 calculates a value of the distance from the image capturing apparatus 101 to the subject, based on the time period in which the infrared light emitted from the infrared light emitting unit is reflected by the subject and the reflected light is received by the light receiving unit. Then, the position information of the subject is calculated, based on the calculated value of the distance and distance image capturing information including the number of sensor pixels of the light receiving unit, the angle of view, and the like, in order to generate the distance image data.

Note that the method for acquiring the distance image data is not necessarily limited as such. Therefore, for example, it is also possible that an optical system similar to the optical unit 102 is mounted instead of the distance image acquiring unit 105, so that the distance image data is acquired by performing a triangulation method based on the disparity between image data of images captured from two different points of view. Furthermore, as will be described later, in a case of not using distance image data for extracting a subject area, which is a pixel area corresponding to a subject, it is possible to omit the distance image acquiring unit 105.

The display unit 106 is a display device, such as a liquid crystal display, which displays image data processed by the image capturing apparatus 101 and various kinds of other data. Note that, since the image capturing apparatus 101 does not include an optical viewfinder as illustrated in the example of FIG. 1, a framing operation (checking of the focus and the composition) is performed by use of the display unit 106. That is, regarding the image capturing apparatus 101, since image capturing is performed while checking the live view image on the display unit 106, the display unit 106 also functions as an electronic viewfinder in a framing or focusing operation. In addition, the display unit 106 also displays a camera setting menu, a development parameter setting user interface, or the like.

The operation button 107 is a button for the user to provide the image capturing apparatus 101 with instructions regarding an operation of switching the operation modes of the image capturing apparatus 101, imaging parameters, etc. Note that, as one of the operation modes, the image capturing apparatus 101 has a strobe image-capturing mode in which image-capturing with the strobe 104 turned on and image-capturing with the strobe 104 turned off are continuously performed. Furthermore, as one of the operation modes, the image capturing apparatus 101 has a correction processing mode for correcting the difference in brightness of subjects according to the distance from the strobe 104 to each subject. Therefore, by use of the operation button 107 or the image capturing button 103, it is possible for the user to perform switching to the correction processing mode and setting of parameters to be used in a correction process.

In addition, it is also possible that the display unit 106 has a touch screen function, and, in that case, a user instruction by use of the touch screen can be processed as an input from the operation button 107.

<Internal Configuration of the Image Capturing Apparatus 101>

Figure 2:
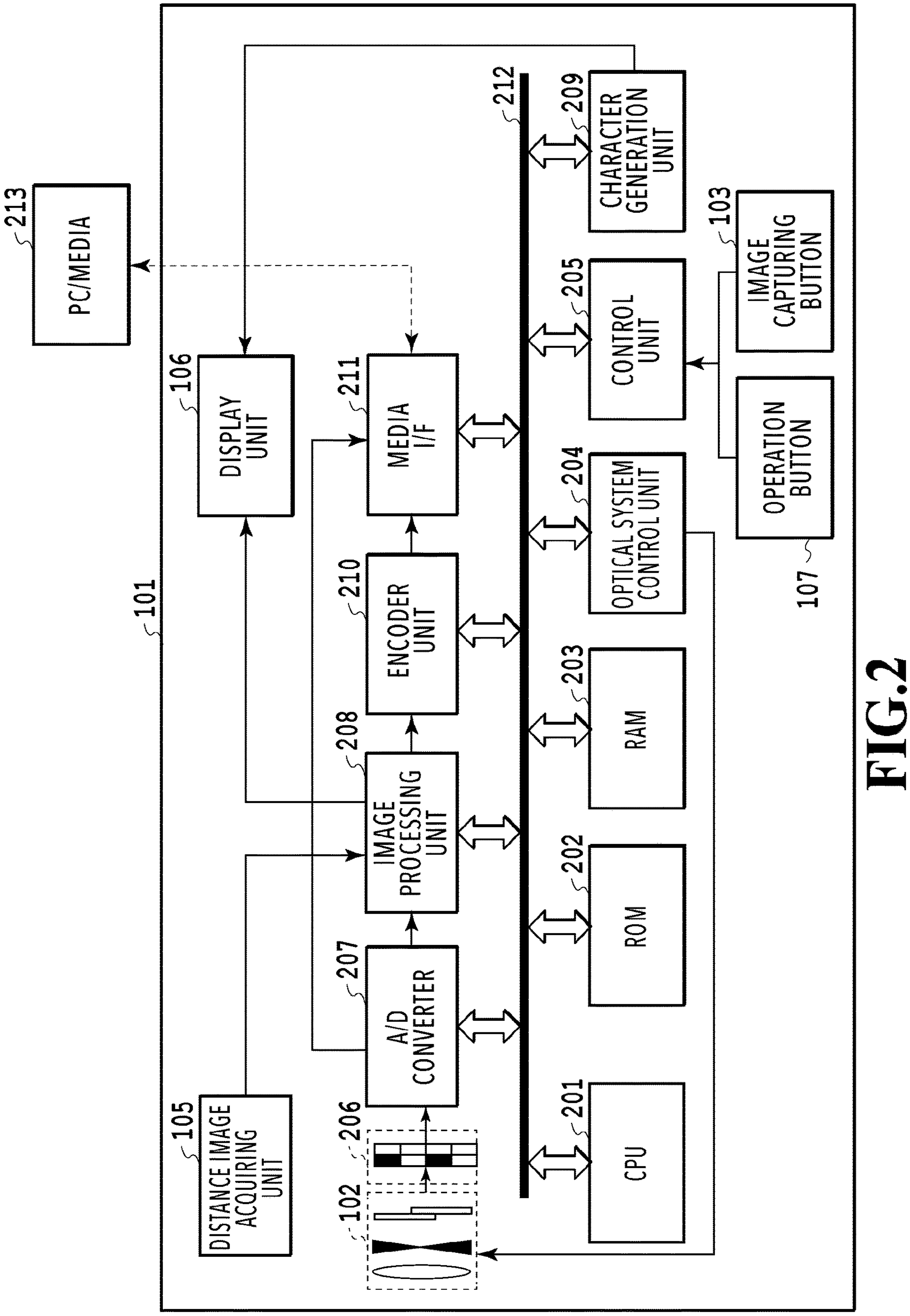
FIG. 2 is a diagram illustrating an internal configuration of the image capturing apparatus including the image processing device according to the first embodiment.

FIG. 2 is a block diagram illustrating the internal configuration of the image capturing apparatus 101 including the image processing device according to an embodiment of the present disclosure.

The CPU 201 is involved in all the processes by each configuration, and the CPU 201 sequentially reads and interprets commands stored in the ROM (Read Only Memory) 202 and the RAM (Random Access Memory) 203, so as to execute processes according to the interpretation results. The ROM 202 stores a program or the like to be executed by the CPU 201. The RAM 203 stores a program to be executed by the CPU 201, various kinds of image data, or the like.

The optical system control unit 204 is a control circuit that controls the optical unit 102 according to instructions from the CPU 201, such as focusing, opening a shutter, and adjusting an aperture.

The control unit 205 is a control circuit that receives a user instruction from the image capturing button 103 or the operation button 107 and controls image capturing, switching to a lighting correction processing mode, setting of illumination parameters, etc.

The color image capturing element unit 206 includes an image capturing element that converts information of light focused by the optical unit 102 into current values. The color image capturing element unit 206 further includes a color filter having a predetermined array such as a Bayer array, and the color filter is used in combination with the image capturing element, so that it is possible to acquire color information of the subject from the light focused by the optical unit 102.

The A/D converter 207 is a processing circuit that converts pixel values, which include luminance information and color information detected by the color image capturing element unit 206, into digital signal values, in order to create RAW image data. Note that, in the present embodiment, it is assumed that the distance image data and the RAW image data captured at the same time can be acquired.

The image processing unit 208 performs a development process on the RAW image data acquired by the A/D converter 207, so as to generate color image data with three channels, in which each pixel corresponds to an RGB component. Furthermore, by use of color image data and distance image data, the image processing unit 208 generates corrected image data, which is acquired by performing a gain correction process on color image data. Note that detail explanations are given of the internal configuration and functions of the image processing unit 208 with reference to FIG. 3, which is described later.

The character generation unit 209 is a processing circuit that generates characters, graphics, etc. The characters and graphics generated by the character generation unit 209 are superimposed on color image data, corrected image data, etc., and displayed on the display unit 106.

The encoder unit 210 converts various kinds of image data such as RAW image data and color image data into a predetermined file format. In the present embodiment, it is assumed that information, etc., at the time of image capturing is saved together with various kinds of image data.

The media I/F 211 is an interface for transmitting and receiving image data to and from the PC/media 213 (for example, a hard disk, a memory card, a CF card, an SD card, etc.). For example, a USB (Universal Serial Bus) or the like is used as the media I/F 211. Image data received through the media I/F 211 can be stored in the RAM 203, and various kinds of image processing can be performed to the image data by the image processing unit 208.

The system bus 212 is a bus for transmitting and receiving data between the above-described configurations.

<Internal Configuration of the Image Processing Unit>

Figure 3:
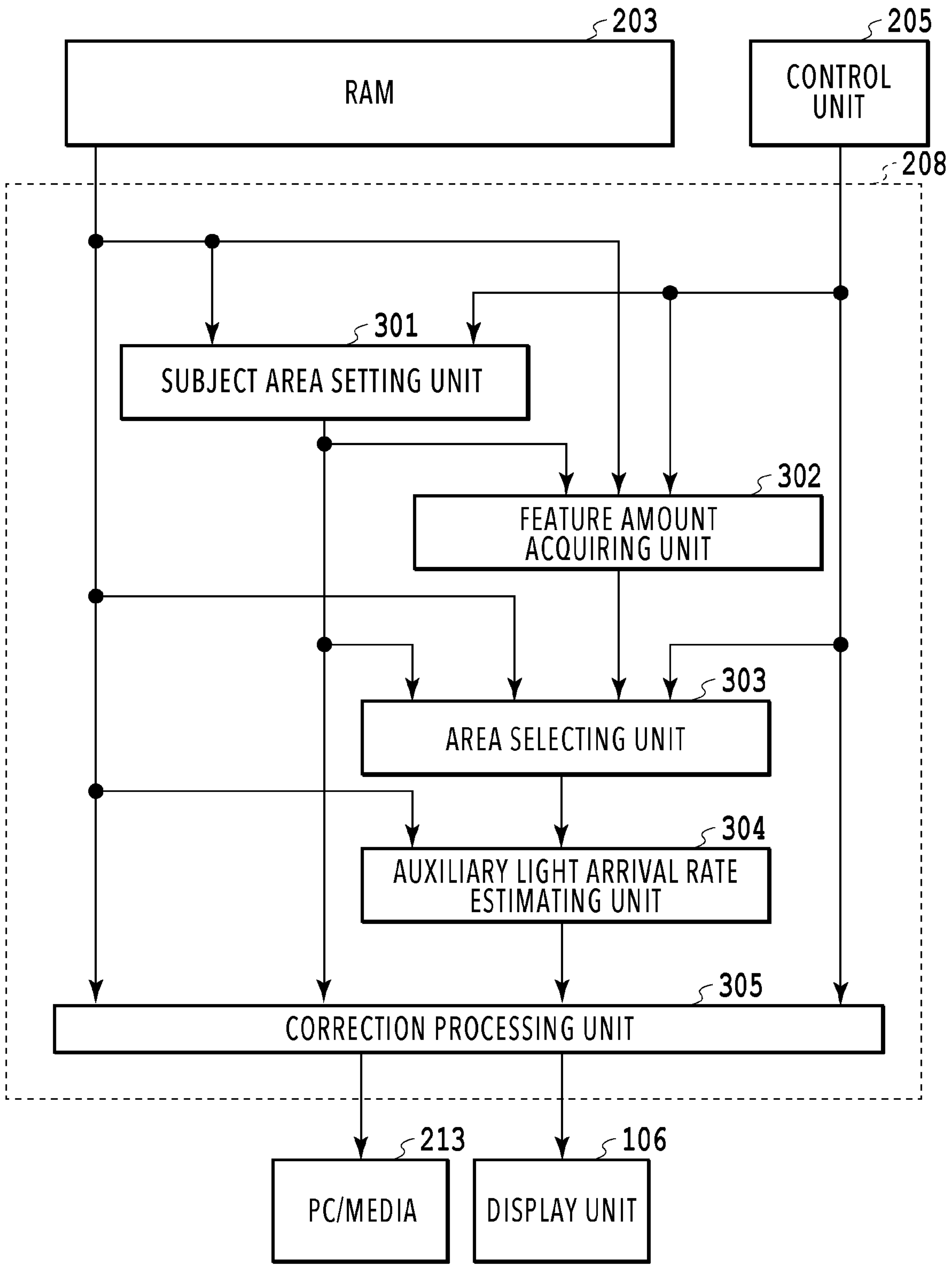
FIG. 3 is a block diagram illustrating a functional configuration of the image processing device according to the first embodiment and a configuration connected to an image processing unit.

FIG. 3 is a block diagram including the functional configuration of the image processing unit 208, which is the image processing device of the present embodiment, and the configuration connected to the image processing unit 208. In the present embodiment, strobe-ON image data captured with the strobe 104 turned on and strobe-OFF image data captured with the strobe 104 turned off are acquired for the same scene. Here, the same scene is not limited to the completely same scene, and even scenes in which the shape/arrangement of a subject is slightly changed may be regarded as the same scene. Then, based on the two image data and the value of the distance from the image capturing apparatus 101 to each subject, which is acquired from the distance image data, the arrival rate (auxiliary light arrival rate) of the strobe light (auxiliary light) is estimated for each subject. Furthermore, based on the estimated auxiliary light arrival rate for each subject, the brightness of the subject area corresponding to each subject in the strobe-ON image data is corrected.

The subject area setting unit 301 sets a subject area for the strobe-ON image data acquired from the RAM 203, based on the distance image data and an user operation acquired from the control unit 205.

Based on the strobe-ON image data acquired from the RAM 203, etc., the feature amount acquiring unit 302 acquires a feature amount related to reflection characteristics such as normal information, gloss information based on a specular reflectance, gloss information based on the brightness and the saturation corresponding to each subject.

The area selecting unit 303 selects a part of the subject area, which is set by the subject area setting unit 301, based on the feature amount acquired by the feature amount acquiring unit 302.

The auxiliary light arrival rate estimating unit 304 estimates an auxiliary light arrival rate, which is the ratio of the strobe light that arrives at each subject, based on the strobe-ON image data and the strobe-OFF image data acquired from the RAM 203 and the area selected by the area selecting unit 303. Since the strobe light is a diffuse light, the auxiliary light arrival rate changes according to the distance between the strobe 104 and the subject.

The correction processing unit 305 performs a gain correction process on the strobe-ON image data, based on the auxiliary light arrival rate for each subject, which is acquired from the auxiliary light arrival rate estimating unit 304, in order to generate corrected image data in which the brightness of the subjects has been corrected. Note that the image capturing apparatus 101 is capable of outputting the corrected image data to a storage device such as the RAM 203 or the PC/media 213 so that the corrected image data is stored and is capable of outputting the corrected image data to the display unit 106 so that the corrected image data is displayed.

<Processing Flow of the Image Processing Unit>

Figure 4:
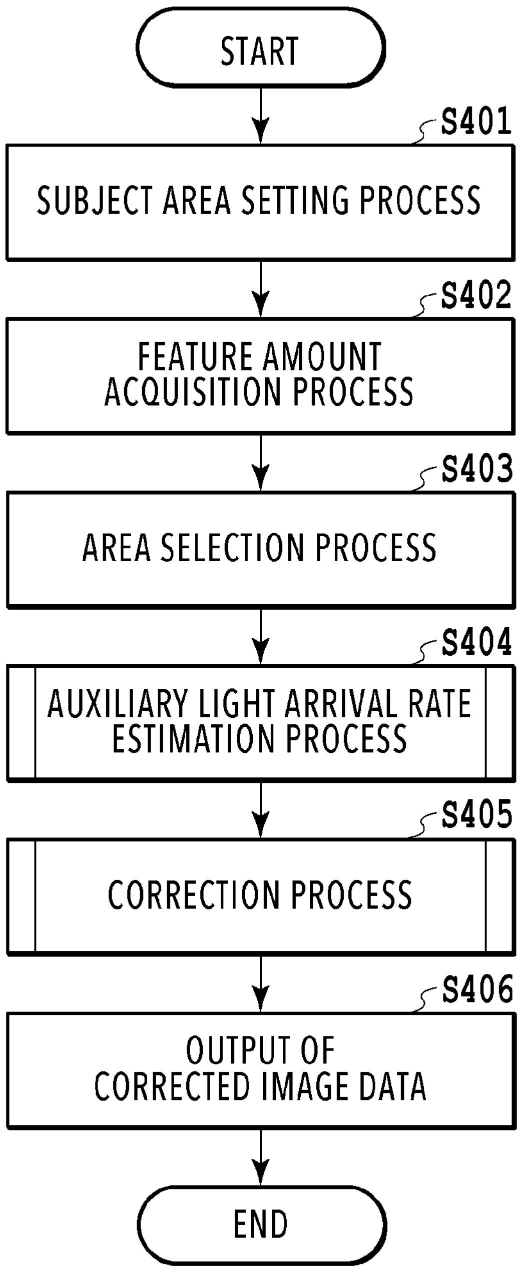
FIG. 4 is a flowchart illustrating a procedure of processing performed by the image processing device according to the first embodiment.

FIG. 4 is a flowchart illustrating a procedure of the processing performed by the image processing unit 208, which is the image processing device according to an embodiment of the present disclosure.

In S401, the image processing unit 208 firstly selects multiple subject areas $r_1$ through $r_N$ from the strobe-ON image data to be corrected.

Next, in S402, from the selected multiple subject areas $r_1$ through $r_N$, the image processing unit 208 acquires a feature amount such as the gloss information corresponding to each subject.

Subsequently, in S403, from each subject area $r_i$, the image processing unit 208 selects a part of the subject area, based on the acquired feature amount.

Then, in S404, regarding the partial area of each subject area $r_i$, which is selected based on a feature amount, the image processing unit 208 estimates the auxiliary light arrival rate corresponding to each subject, based on a pixel value of the strobe-ON image data and a pixel value of the strobe-OFF image data.

Thereafter, in S405, based on the estimated auxiliary light arrival rate, the image processing unit 208 corrects the brightness of each subject area $r_i$ of the strobe-ON image data, in order to generate corrected image data.

Finally, in S406, the image processing unit 208 outputs the corrected image data to the RAM 203 or the like.

Hereinafter, a detail description is given of the operation procedure of the above-described image processing unit 208.

In S401, the subject area setting unit 301 sets a subject area $r_i$ in the corresponding image data, based on a user input acquired by the control unit 205 and distance image data acquired from the RAM 203. First, explanations are given of the distance image data used in the present step as well as the corresponding image data and subjects.

Figure 5A:
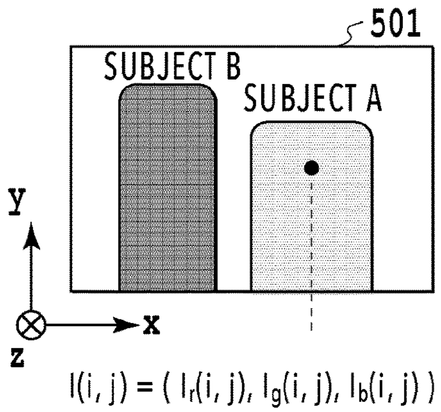
FIG. 5A is a diagram illustrating an example of image data according to the first embodiment.
Figure 5B:
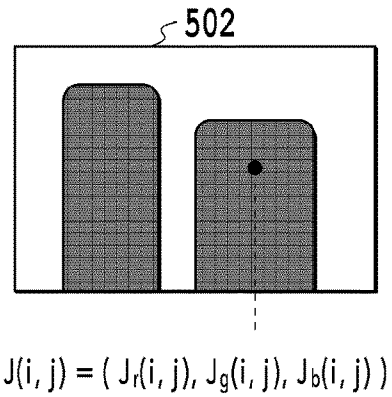
FIG. 5B is a diagram illustrating an example of image data according to the first embodiment.
Figure 5C:
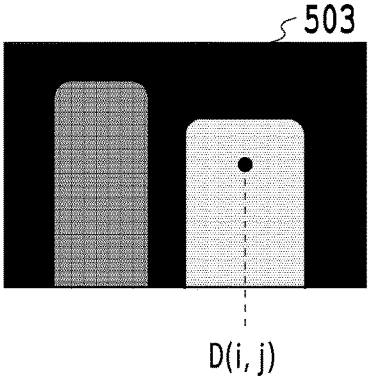
FIG. 5C is a diagram illustrating an example of image data according to the first embodiment.
Figure 5D:
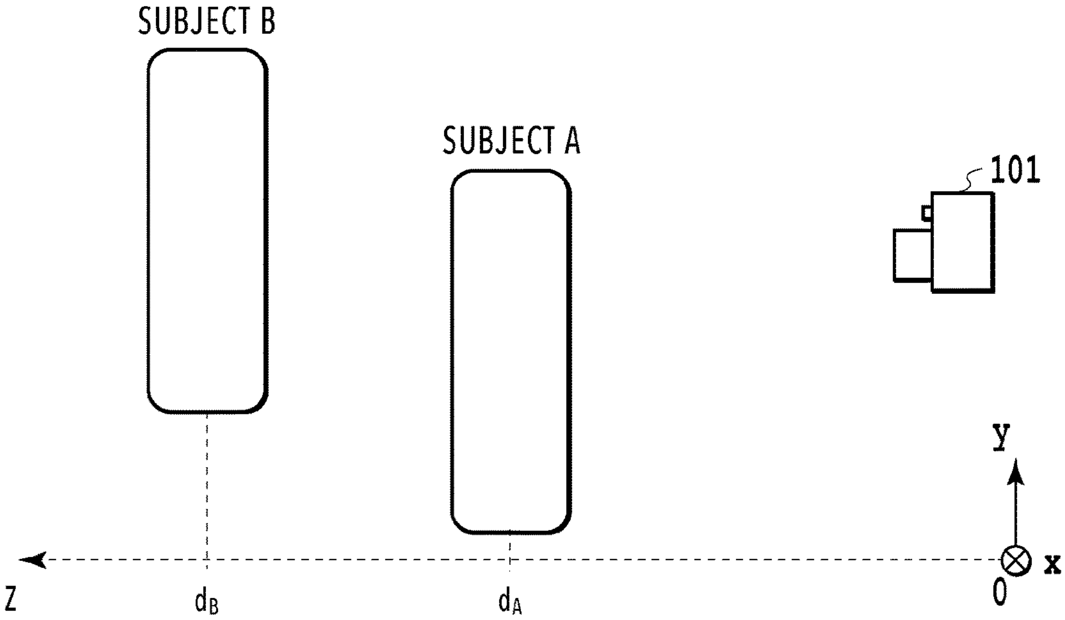
FIG. 5D is a diagram illustrating an example of image data according to the first embodiment.

In FIGS. 5A through 5C, an example of the strobe-ON image data 501, the strobe-OFF image data 502, and the distance image data 503 in the present embodiment is illustrated. FIG. 5D is a diagram illustrating the image capturing apparatus 101, the subject A, and the subject B viewed from a direction orthogonal to the optical axis of the optical unit 102 of the image capturing apparatus 101. The pixel value corresponding to the pixel x (=(i,j)) of the strobe-ON image data 501 is represented as I(x), and it is assumed that an RGB value is stored as the pixel value. Similarly, for the strobe-OFF image data 502, the pixel value corresponding to the pixel x is represented as J(x). It is assumed that, for the pixel x of the distance image data 503, the value of the distance from the image capturing apparatus 101 to the subject is stored as the pixel value D(x). In the present embodiment, as illustrated in FIGS. 5A through 5D, the scene in which the subject A is present in the front right and the subject B is present in the back left in a front view is taken as an example for describing the operation procedure.

Figure 6A:
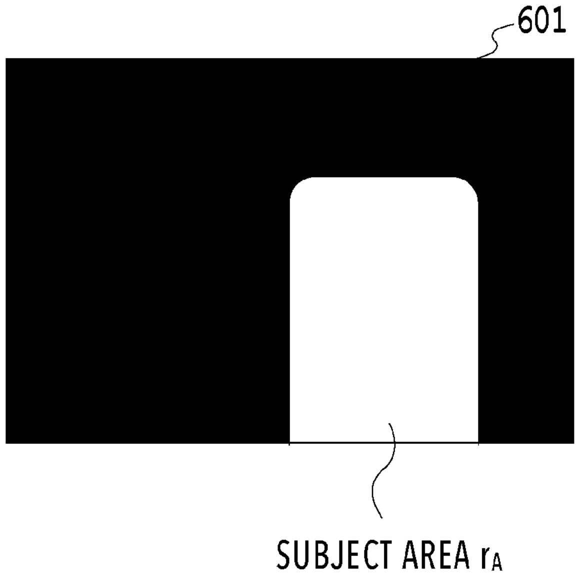
FIG. 6A is a diagram illustrating an example of a subject area according to the first embodiment.
Figure 6B:
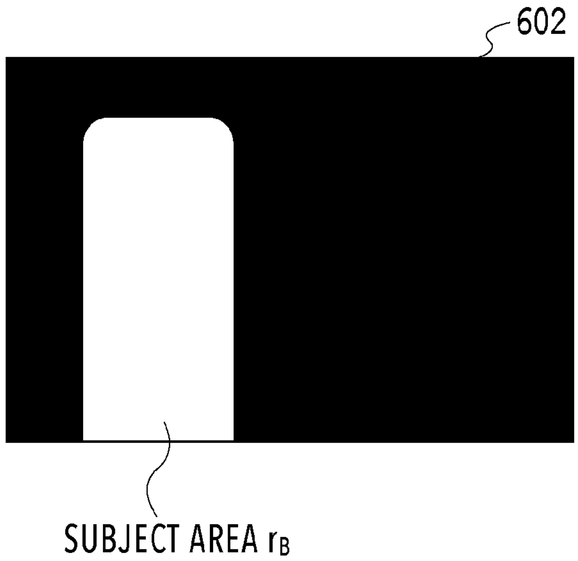
FIG. 6B is a diagram illustrating an example of a subject area according to the first embodiment.

In the present step S401, firstly, the position information of at least one pixel, which is selected by the user and respectively corresponding to the subject A and the subject B, is acquired by the control unit 205. Next, based on the distance image data 503, the value of the distance between the subject A and the image capturing apparatus 101, which corresponds to the position information of a pixel corresponding to the subject A, is acquired as the subject distance $d_A$. Then, from the distance image data 503, pixels of which the value of the distance is close to the subject distance $d_A$ are extracted as the subject area $r_A$. Similarly, as for the subject B, the subject distance $d_B$ is acquired, based on the distance image data 503 and the position information of a pixel corresponding to the subject B, and the pixels of which the value of the distance is close to the subject distance $d_B$ are extracted from the distance image data 503 as the subject area $r_B$. In FIG. 6A, binary image data 601 in which the subject area $r_A$ is represented as white is illustrated, and, in FIG. 6B, binary image data 602 in which the subject area $r_B$ is represented as white is illustrated.

Figure 7:
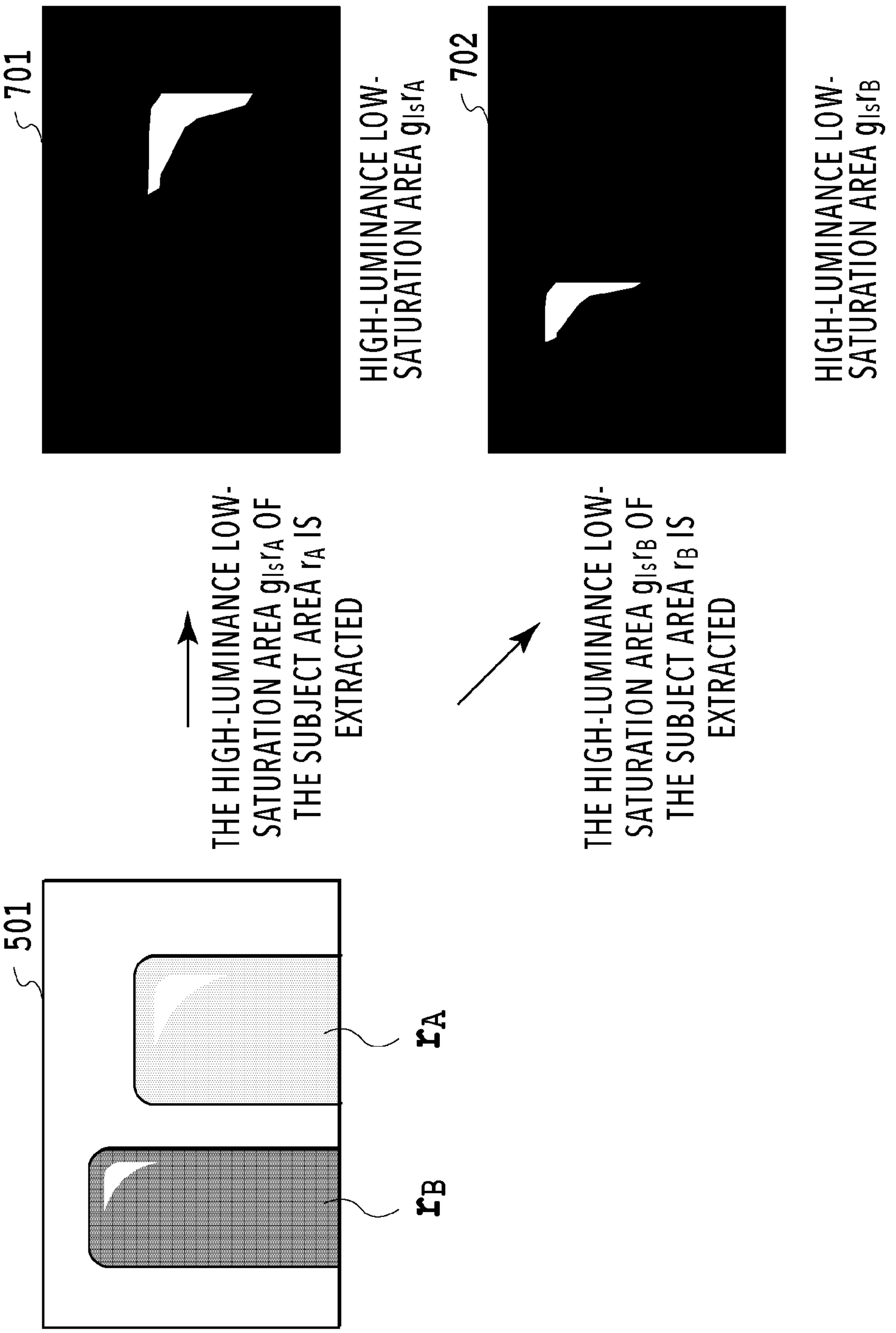
FIG. 7 is a diagram illustrating an overview of a feature amount acquisition process according to the first embodiment.

In S402, based on the strobe-ON image data 501 that has been acquired by the feature amount acquiring unit 302 from the RAM 203 and the subject areas $r_A$ and $r_B$ that have been set by the subject area setting unit 301, the feature amounts of the respective subject areas $r_A$ and $r_B$ in the strobe-ON image data 501 are acquired. In the present embodiment, gloss information is acquired as a feature amount. In the present embodiment, based on the luminance and the saturation, a highly glossy area (high-luminance low-saturation area $g_{ls}r$) is extracted as the gloss information. The high-luminance low-saturation area $g_{ls}r$ can be extracted by threshold-based processing performed on luminance values and saturation values calculated from RGB pixel values, for example. For example, from among the pixels included in the subject areas of the strobe-ON image data 501, an area formed with pixels having a pixel value of which the luminance value is high enough to be equal to or greater than a predetermined threshold value and the saturation value is low enough to be equal to or lower than a predetermined threshold value is set as a gloss area. In FIG. 7, examples of a high-luminance low-saturation area $g_{ls}r$ are illustrated. Binary image data 701, in which the high-luminance low-saturation area $g_{ls}r_A$ corresponding to the subject area $r_A$ is represented as white, and binary image data 702, in which the high-luminance low-saturation area $g_{ls}r_B$ corresponding to the subject area $r_B$, are illustrated.

Figure 8A:
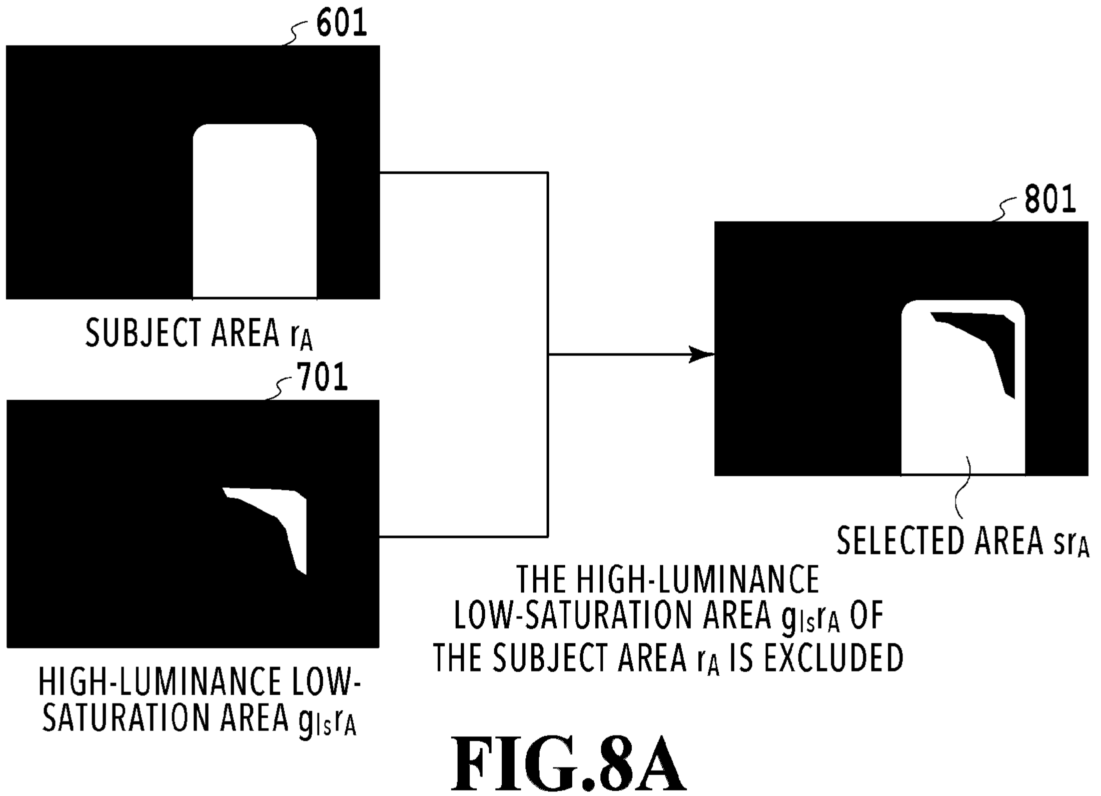
FIG. 8A is a diagram illustrating an overview of an area selection process according to the first embodiment.
Figure 8B:
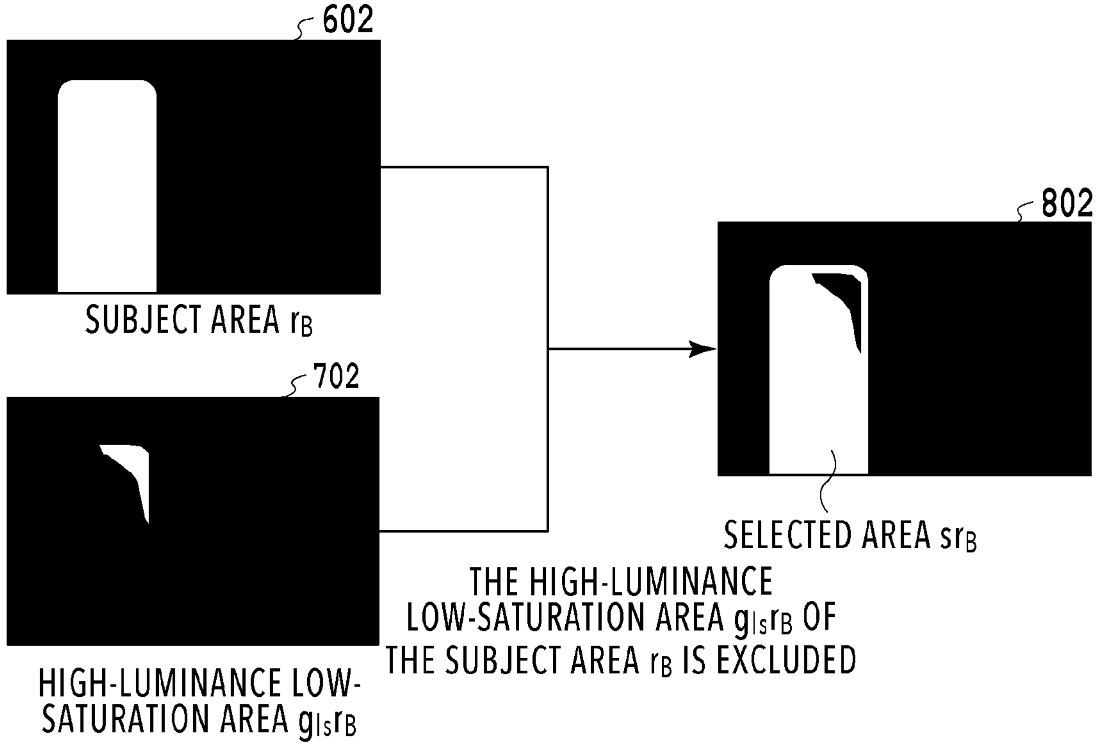
FIG. 8B is a diagram illustrating an overview of the area selection process according to the first embodiment.

In S403, based on a feature amount acquired by the feature amount acquiring unit 302, the area selecting unit 303 selects a partial area in a subject area that has been set by the subject area setting unit 301. Hereinafter, the area selected as such is referred to as a selected area. In the present embodiment, the selected area is the area acquired by excluding a gloss area, which has been acquired by as a feature amount, from a subject area. In FIG. 8A, an example of binary image data 801 in which the selected area $sr_A$ is represented as white, which is acquired based on the binary image data 601 in which the subject area $r_A$ is represented as white and the binary image data 701 in which the high-luminance low-saturation area $g_{ls}r_A$ is represented as white, is illustrated. Furthermore, in FIG. 8B, an example of binary image data 802 in which the selected area $sr_B$ is represented as white, which is acquired based on the binary image data 602 in which the subject area $r_B$ is represented as white and the binary image data 702 in which the high-luminance low-saturation area $g_{ls}r_B$ is represented as white, is illustrated.

In S404, the auxiliary light arrival rate estimating unit 304 estimates the auxiliary light arrival rate of the strobe light, which is emitted by the strobe 104, based on the binary image data 801 and 802 representing the selected areas $sr_A$ and $sr_B$ of the strobe-ON image data 501 and the strobe-OFF image data 502. Details of the auxiliary light arrival rate estimation process in the present step will be described later.

In S405, the correction processing unit 305 respectively corrects the brightness of the subject areas $r_A$ and $r_B$ corresponding to the respective subjects in the strobe-ON image data 501, based on the auxiliary light arrival rates estimated for the respective subjects, in order to generate corrected image data. Details of the correction process in the present step will be described later.

In S406, the correction processing unit 305 outputs the generated corrected image data to the PC/media 213, so that the corrected image data is recorded. Furthermore, it is also possible that the corrected image data is output to the display unit 106, so that the corrected image data is displayed. Then, the series of processes performed by the image processing unit 208 ends.

<Auxiliary Light Arrival Rate Estimation Process>

Figure 9:
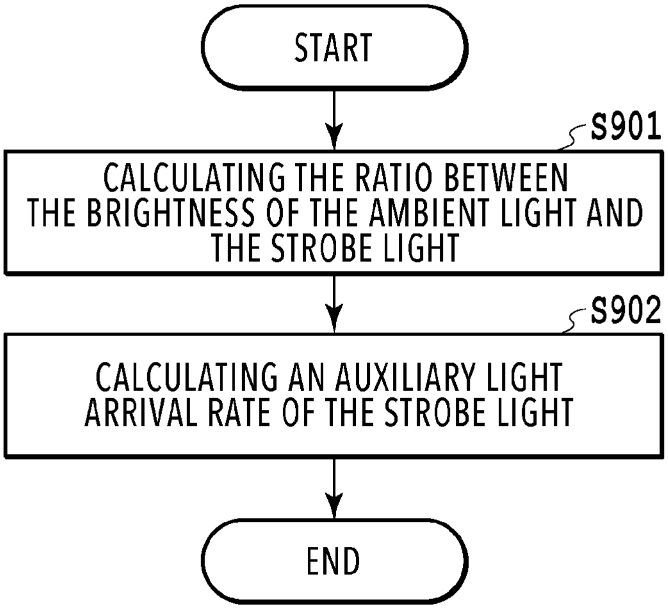
FIG. 9 is a flowchart illustrating a procedure of an auxiliary light arrival rate estimation process according to the first embodiment.

Here, an explanation is given of the auxiliary light arrival rate estimation process performed by the auxiliary light arrival rate estimating unit 304 in S404. In the auxiliary light arrival rate estimation process of the present embodiment, the auxiliary light arrival rate for each subject is estimated, based on the selected areas $sr_A$ and $sr_B$ of the strobe-ON image data 501 and the strobe-OFF image data 502. In FIG. 9, a procedure of the auxiliary light arrival rate estimation process is illustrated.

In S901, the auxiliary light arrival rate estimating unit 304 estimates the ratio between the brightness of the ambient light and the strobe light in the captured scene. In the present embodiment, the pixel value I(x) in the strobe-ON image data 501 and the pixel value J(x) in the strobe-OFF image data 502 are modeled as the products of the brightness of the ambient light and the strobe light and a reflectance, as in Expression 1 below.

$$I(x)=(L_a+\alpha(x)L_s)R(x)$$

$$J(x)=\beta L_a R(x) \quad \text{[Expression 1]}$$

Here, $L_a$ represents the brightness of the ambient light, $L_s$ represents the brightness of the strobe light, and a(x) represents the auxiliary light arrival rate of the strobe light in the distance between the image capturing apparatus 101 and the subject corresponding to the pixel x. R(x) represents the reflectance, and β represents the exposure ratio between the strobe-ON image data 501 and the strobe-OFF image data 502. β is set based on the image capturing conditions, etc., of the strobe-ON image data 501 and the strobe-OFF image data 502. Here, α(x) can be acquired as in Expression 2, based on Expression 1.

$$\alpha(x)=\frac{L_a}{L_s}\left(\beta\frac{I(x)}{J(x)}-1\right) \quad \text{[Expression 2]}$$

Next, in the present embodiment, the average pixel value $I_{t\_ave}$ of the reference selected area $sr_t$, which is to be the reference, in the strobe-ON image data 501 and the average pixel value $J_{t\_ave}$ of the selected area $sr_t$ in the strobe-OFF image data 502 are calculated as in Expression 3 below.

$$I_{t\_ave}=\frac{1}{M_t}\sum_{x\in sr_t} I(x) \quad \text{[Expression 3]}$$

$$J_{t\_ave}=\frac{1}{M_t}\sum_{x\in sr_t} J(x)$$

Here, $sr_t$ is the reference selected area, and Mt is the number of pixels of the reference selected area $sr_t$. The reference selected area $sr_t$ is the selected area corresponding to the reference subject of the multiple subjects A and B, which is to be the reference of brightness. That is, the reference selected area $sr_t$ is either one of the selected areas $sr_A$ and $sr_B$. In the present embodiment, the reference subject is selected based on a user operation. Furthermore, in the present embodiment, if the auxiliary light arrival rate α is 1 in a case where the average pixel values $I_{t\_ave}$ and $J_{t\_ave}$ of the reference subject are applied to Expression 2, the approximate value ω of the ratio between the brightness $L_s$ of the ambient light and the brightness $L_a$ of the strobe light is calculated as in Expression 4 below, based on Expressions 2 and 3.

$$\frac{L_s}{L_a}\cong\omega=\beta\frac{I_{t\_ave}}{J_{t\_ave}}-1 \quad \text{[Expression 4]}$$

In S902, the auxiliary light arrival rate estimating unit 304 estimates the auxiliary light arrival rate a(x) of the strobe light in the distance between the image capturing apparatus 101 and each subject in the case where the ratio of the brightness $L_s$ of the ambient light and the brightness $L_a$ of the strobe light is ω, based on Expression 4. The auxiliary light arrival rate estimating unit 304 calculates an approximate value of the auxiliary light arrival rate a(x) as in Expression 5 below, based on Expressions 2 and 4.

$$\alpha(x)\cong\frac{1}{\omega}\left(\beta\frac{I(x)}{J(x)}-1\right) \quad \text{[Expression 5]}$$

Through the above-described process, the auxiliary light arrival rate α(x) of the strobe light can be estimated.

As described above, in the present embodiment, the auxiliary light arrival rate a(x) of the strobe light emitted by the strobe 104 is calculated, based on the pixel values I(x) and J(x) of the selected areas $sr_A$ and $sr_B$, which are acquired by excluding the high-luminance low-saturation areas $g_{ls}r_A$ and $g_{ls}r_B$ from the subject areas $r_A$ and $r_B$, respectively. Therefore, in the present embodiment, the auxiliary light arrival rate α(x) of the strobe light can be estimated with no influence by the gloss of the subjects.

<Correction Processing>

Figure 10:
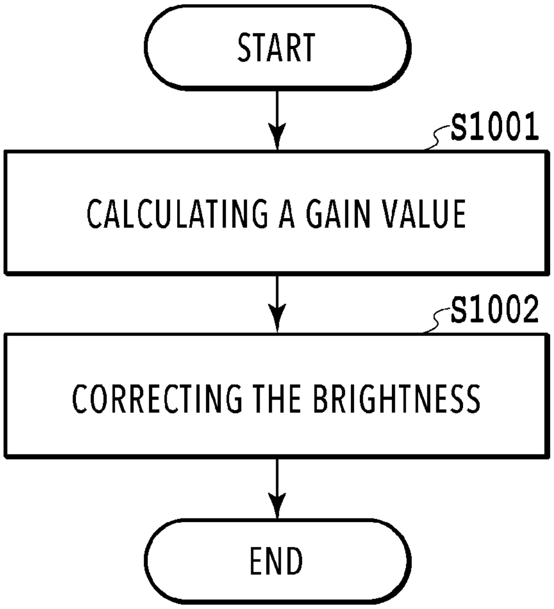
FIG. 10 is a flowchart illustrating a procedure of a correction process according to the first embodiment.

Here, an explanation is given of the correction process performed by the correction processing unit 305 in S405. In the correction process of the present embodiment, the correction processing unit 305 generates corrected image data in which the brightness of the subjects is corrected by gain processing, based on the strobe-ON image data 501 and the auxiliary light arrival rate a(x) estimated by the auxiliary light arrival rate estimating unit 304. In FIG. 10, a procedure of the correction process is illustrated.

In S1001, the correction processing unit 305 calculates gain values, which are pixel value correction coefficients corresponding to the respective subjects. The gain value $g_i$, which corresponds to the i-th subject, is calculated according to Expression 6, based on the auxiliary light arrival rate a(x) and the ratio ω of the brightness of the ambient light and the strobe light.

$$g_i=\frac{1+\omega}{1+\mu_i} \quad \text{[Expression 6]}$$

$$\mu_i=\frac{\omega}{M_i}\sum_{x\in r_i}\alpha(x)$$

Here, $r_i$ represents the subject area corresponding to the i-th subject, and $M_i$ represents the number of pixels of rt. Next, according to Expression 7, the gain value $g_i$, which corresponds to each subject, is corrected by use of the gain value $g_t$ corresponding to the reference subject for which the reference selected area $sr_t$ is set, in order to calculate the corrected gain value $g'_i$.

$$g'_i=\frac{g_i}{g_t} \quad \text{[Expression 7]}$$

In S1002, the correction processing unit 305 corrects the brightness of the pixel value I(x) of the strobe-ON image data by use of the corrected gain value $g'_i$, in order to generate the corrected pixel value I'(x). The corrected pixel value I'(x) is calculated as in Expression 8 below.

$$I'(x)=\{1+\Sigma_i(g'_i-1)R_i(x)\}I(x) \quad \text{[Expression 8]}$$

Here, $R_i(x)$ is a map representing the i-th subject area and has such a value as in Expression 9 below.

$$R_i(x) = \begin{cases} 1 & (x \in r_i) \\ 0 & (\text{otherwise}) \end{cases} \quad \text{[Expression 9]}$$

Through the above-described process, it is possible to acquire a corrected image of which the brightness of the i-th subject area $r_i$ has been corrected by use of the corresponding corrected gain value $g'_i$. Accordingly, in the present embodiment, an auxiliary light arrival rate α is acquired by use of a selected area, which is acquired by excluding a gloss area from a subject area, and then the subject area including the gloss area is corrected based on the acquired auxiliary light arrival rate α.

Figure 11:
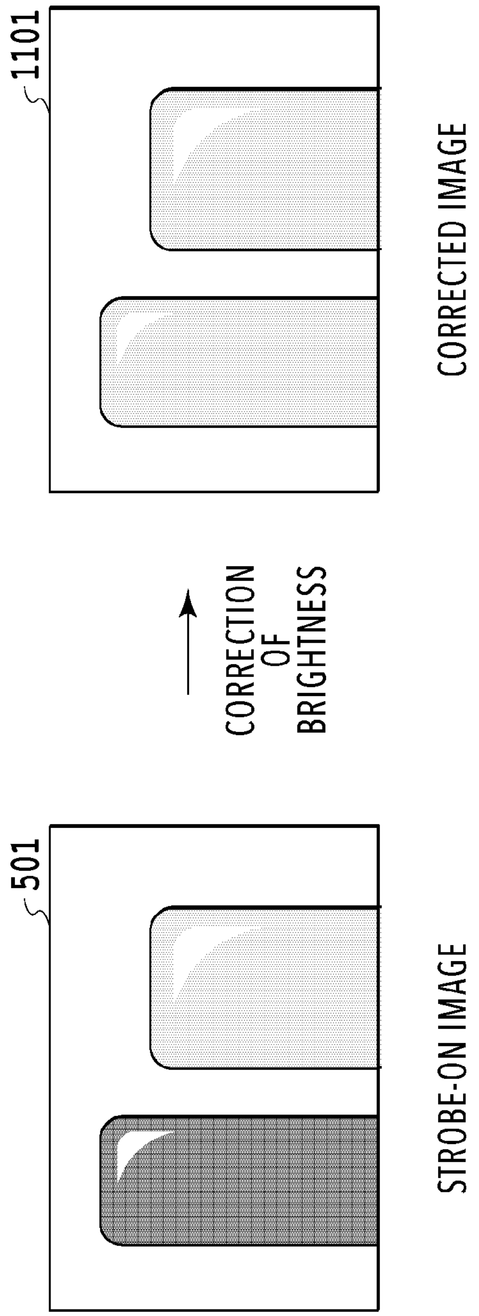
FIG. 11 is a diagram illustrating an overview of the correction process according to the first embodiment.

In FIG. 11, an example of the corrected image data 1101 is illustrated. The corrected pixel value I'(x) (x is an element of $r_A$) of the subject area $r_A$ 601 is $g'_A I(x)$. Furthermore, the corrected pixel value I'(x) (x is an element of $r_B$) of the subject area $r_B$ 602 is $g'_B I(x)$. Moreover, the corrected pixel value I'(x) (x is not an element of $r_A$, $r_B$) other than the subject area $r_A$ 601 and the subject area $r_B$ 602 is I(x). Note that, for example, in a case where the subject A is the reference subject, $g'_A$ is 1 ($g'_A=1$) and the corrected pixel value I'(x) (x is an element of $r_A$) of the subject area $r_A$ 601 is I(x).

In this way, by correcting a pixel value by use of a corrected gain value g', which is acquired for each subject area, it is possible to reduce the difference in brightness between subjects having different auxiliary light arrival rates a of the strobe light.

As described above, with the image processing device according to an embodiment of the present disclosure, it is possible to appropriately correct brightness of each subject according to the distance to the subject even for glossy subjects, based on reflection characteristic information.

Note that, although a subject area is extracted based on distance image data in the present embodiment, the method for extracting a subject area is not limited as such. For example, it is also possible to extract a specific subject area from the strobe-ON image data 501 by use of a recognition process. Alternatively, it is also possible that the user designates a subject area. As described above, in a case where distance image data is not used for extracting a subject area, there is no need of distance image data, which is information of the distance from the image capturing apparatus 101 to a subject, in the processing performed by the image processing unit 208 of the present disclosure. Therefore, the distance image acquiring unit 105, which is a distance information acquiring unit, can be omitted.

Further, although an area having pixel values with a high luminance value and a low saturation value of a subject is extracted as gloss information in the present embodiment, the method for extracting the gloss area is not limited as such. For example, it is also possible to extract the specular reflection components of a subject as the gloss information and perform threshold-based processing on the specular reflection components, in order to extract a gloss area. In this case, the strobe-ON image data is segmented into diffuse reflection components and specular reflection components by use of a dichromatic reflection model, in which the reflected light from a subject is represented by the linear sum of the diffuse reflection components, which correspond to an object color, and the specular reflection components, which correspond to a light-source color. Then, by performing threshold-based processing on the specular reflection components and extracting an area having pixel values of which the specular reflection component is greater than a predetermined value, a gloss area can be acquired.

Furthermore, although the ratio ω between brightness of the ambient light and the strobe light is calculated based on the reference subject selected based on the user operation in the present embodiment, the method for calculating ω is not limited as such. For example, it is also possible that the reference subject for calculating ω is the subject on which the strobe light is the brightest. Specifically, first, according to Expression 10, co' is calculated based on the selected area $sr_i$ corresponding to each subject.

$$\omega_i = \beta \frac{I_{i\_ave}}{J_{i\_ave}} - 1 \quad \text{[Expression 10]}$$

$$I_{i\_ave} = \frac{1}{M_i} \sum_{x \in sr_i} I(x)$$

$$J_{i\_ave} = \frac{1}{M_i} \sum_{x \in sr_i} J(x)$$

Then, according to Expression 11, the maximum value of $\omega_i$ can be utilized as ω.

$$\omega = \max_i \omega_i \quad \text{[Expression 11]}$$

Furthermore, regarding the gain value $g_i$, although the corrected gain value $g'_i$ is utilized according to Expression 7 in the present embodiment, it is also possible to directly utilize the gain value $g_i$ of Expression 6 without correction.

Through the above processing, it is possible to set the subject on which the strobe light is the brightest as the reference subject.

Note that, although position information of a subject is acquired based on a user input in S401 of the present embodiment, it is also possible that the image processing unit 208 detects a specific shape such as a face, so that an area including the detected specific shape is acquired as the position information of the subject.

Second Embodiment

In the first embodiment, a selected area is extracted from a subject area, based on gloss information acquired as a feature amount. However, in the present embodiment, a selected area is extracted from a subject area, based on specular reflection characteristic information of a subject, which is acquired as a feature amount. Note that, in the present embodiment, the case in which the subjects are persons is taken as an example for the explanation.

Figure 12A:
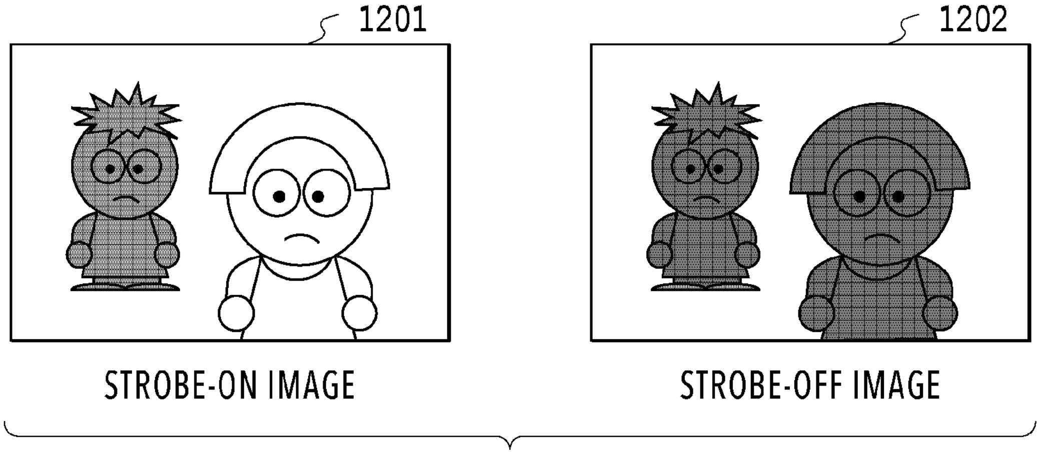
FIG. 12A is a diagram illustrating an example of subject areas according to the second embodiment.
Figure 12B:
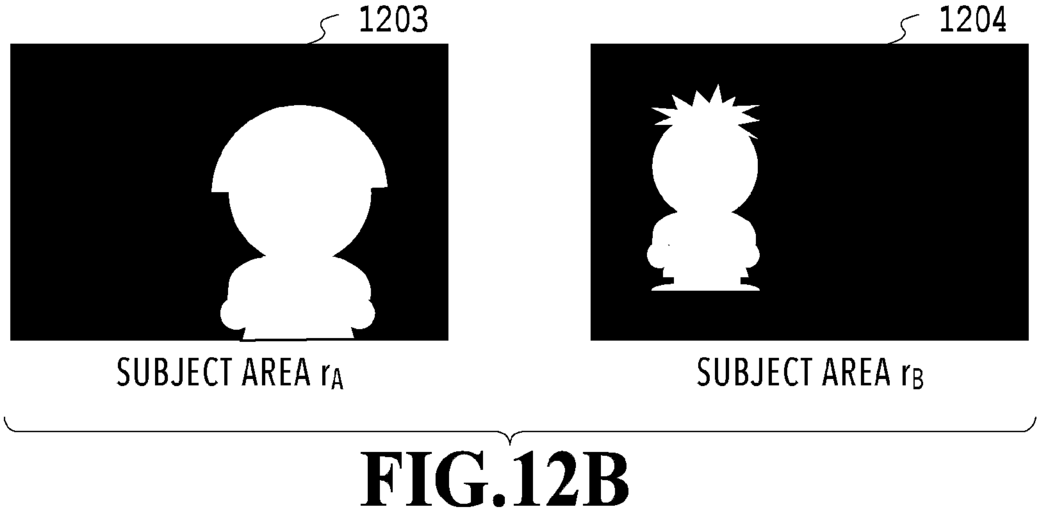
FIG. 12B is a diagram illustrating an example of subject areas according to the second embodiment.

In FIG. 12A, the strobe-ON image data 1201 and the strobe-OFF image data 1202 in the present embodiment are illustrated. Furthermore, in FIG. 12B, the subject area $r_A$ 1203 of the subject A and the subject area $r_B$ 1204 of the subject B in the present embodiment are illustrated. The present embodiment is different from the first embodiment in the aspects of the feature amount acquisition process performed by the feature amount acquiring unit 302 in S402 and the area selection process performed by the area selecting unit 303 in S403. Hereinafter, an explanation is given of each process.

Feature Amount Acquisition Process in the Second Embodiment

Figure 13:
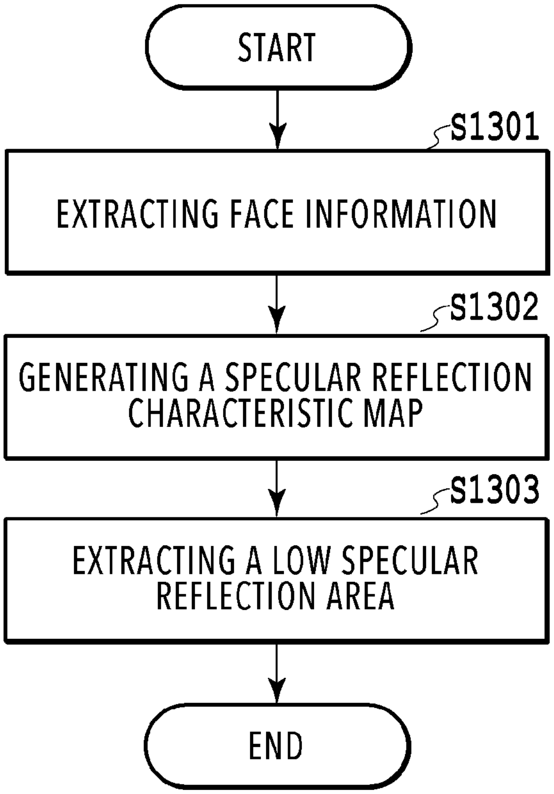
FIG. 13 is a diagram illustrating a flow of the feature amount acquisition process according to the second embodiment.

Here, an explanation is given of the feature amount acquisition process performed by the feature amount acquiring unit 302 in S402 in the present embodiment. In the feature amount acquisition process according to the present embodiment, a low specular reflection area $g_m r$ of a subject is acquired, based on face information in the strobe-ON image data 1201. In FIG. 13, a procedure of the feature amount acquisition process in the second embodiment is illustrated.

In S1301, the feature amount acquiring unit 302 acquires face information corresponding to each subject from the strobe-ON image data 1201. Note that the face information of the present embodiment includes position information of facial organs such as eyes, a nose, and a mouth. For the acquisition of face information, for example, template matching, an algorithm using a Haar-Like feature amount, or the like can be utilized.

In S1302, a specular reflection characteristic map corresponding to the strobe-ON image data 1201 is generated, based on the face information of each subject acquired by the feature amount acquiring unit 302 in S1301. For acquiring the specular reflection characteristic map in the present embodiment, a face specular reflection characteristic template is positioned based on the face information acquired from the strobe-ON image data 1201.

Figure 14A:
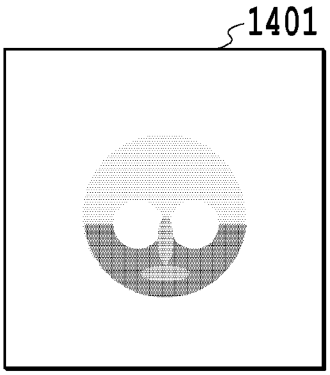
FIG. 14A is a diagram illustrating an overview of the feature amount acquisition process according to the second embodiment.
Figure 14B:
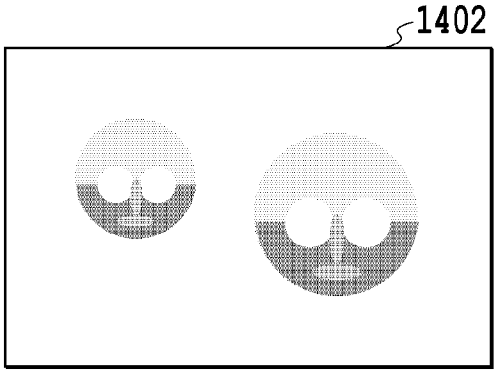
FIG. 14B is a diagram illustrating an overview of the feature amount acquisition process according to the second embodiment.

In FIGS. 14A and 14B, an example of the face specular reflection characteristic template 1401 and the specular reflection characteristic map 1402 are illustrated, respectively. The face specular reflection characteristic template 1401 is image data that has pixel values corresponding to specular reflectance representing the specular reflection characteristic of a model face. Furthermore, it is assumed that position information of facial organs such as eyes, a nose, and a mouth is held in the face specular reflection characteristic template 1401. In the present embodiment, it is assumed that the specular reflectance of a face is held as pixel values. For example, the pixels corresponding to hair, eyes, a nose, and a mouth area have pixel values with high specular reflectance, and the pixels corresponding to the other skin areas have pixel values with low specular reflectance.

In the present step S1302, first, the position information of the facial organs of each subject included in the strobe-ON image data 1201 is associated with the position information of the corresponding facial organs in the face specular reflection characteristic template 1401. Next, based on the associated position information, transformation parameters for transforming the face specular reflection characteristic template 1401 into a shape corresponding to the face image of each subject included in the strobe-ON image data 1201 is calculated. As the transformation parameters, a projective transformation parameter, an affine transformation parameter, or the like can be utilized. Then, based on the calculated transformation parameters, the face specular reflection characteristic template 1401 is transformed so as to match the shape of the face image in each subject, and the face specular reflection characteristic template 1401 corresponding to each subject is combined, in order to generate the specular reflection characteristic map 1402.

Figure 14C:
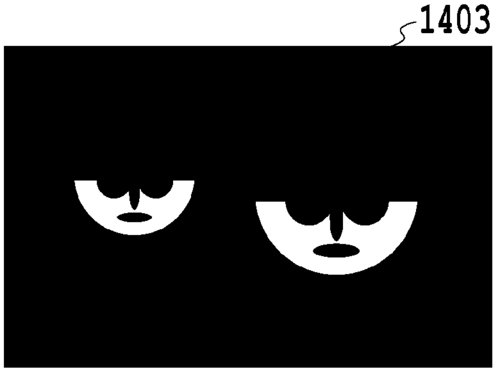
FIG. 14C is a diagram illustrating an overview of the feature amount acquisition process according to the second embodiment.

In S1303, the feature amount acquiring unit 302 extracts a low specular reflection area $g_m r$, based on the specular reflection characteristic map 1402 acquired in S1302. Here, by threshold-based processing for extracting pixels with low pixel values (specular reflectance) from the specular reflection characteristic map 1402, a low specular reflection area $g_m r$ of which the specular reflectance is lower than a predetermined value. In FIG. 14C, an example of binary image data 1403 in which the low specular reflection area $g_m r$ is represented as white.

Area Selection Process in the Second Embodiment

Here, an explanation is given of the area selection process performed by the area selecting unit 303 in S403 in the present embodiment. In the area selection process of the present embodiment, based on the binary image data 1403 in which the low specular reflection area $g_m r$ is represented as white, only the pixels included in the low specular reflection area $g_m r$ of the subject areas $r_A$ and $r_B$ are set as the selected area.

Figure 15A:
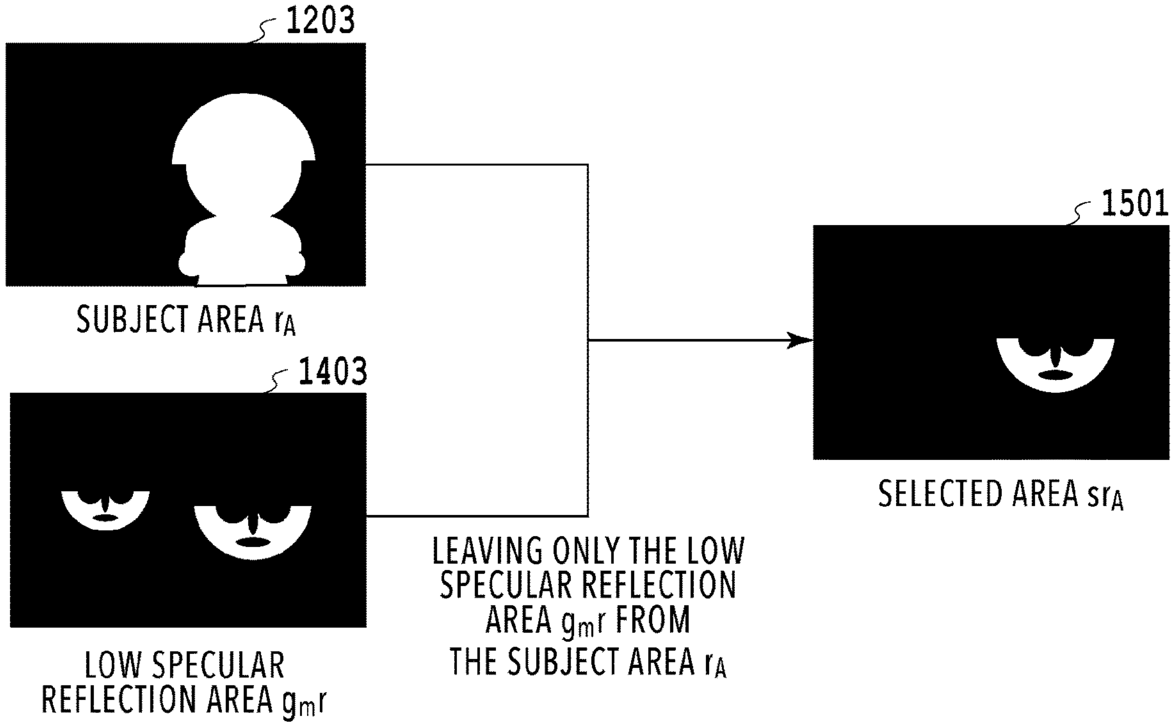
FIG. 15A is a diagram illustrating an overview of the area selection process according to the second embodiment.
Figure 15B:
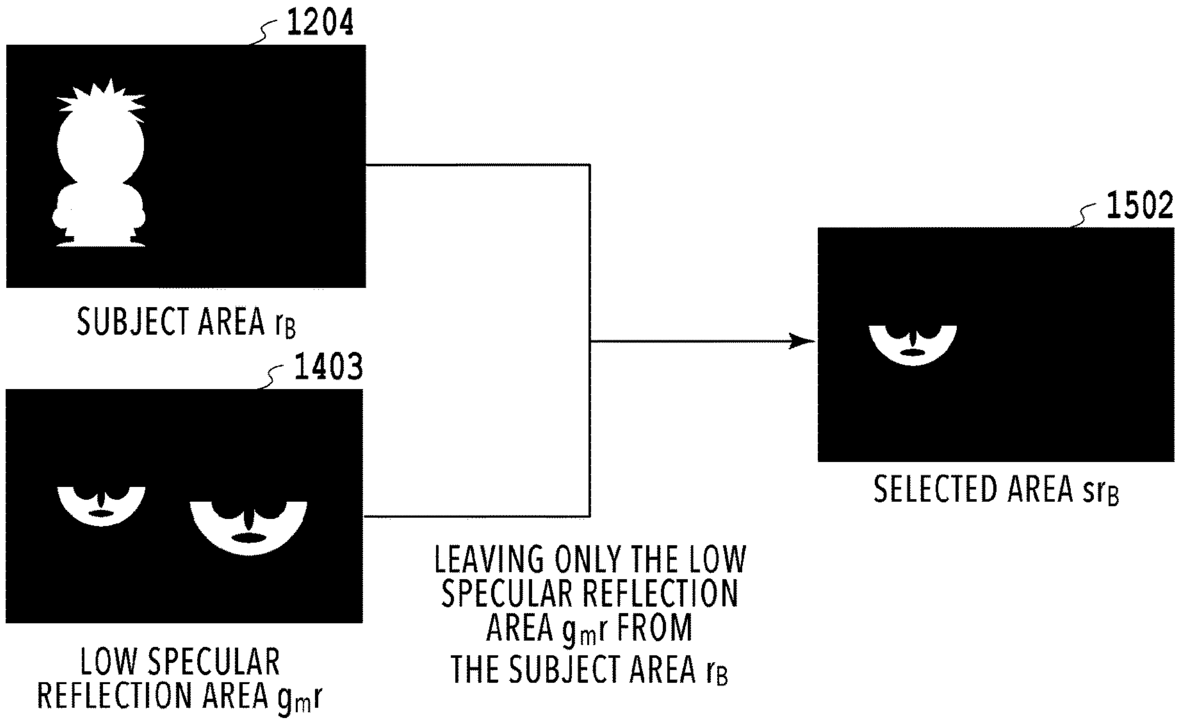
FIG. 15B is a diagram illustrating an overview of an area selection process according to the second embodiment.

In FIG. 15A, an example of binary image data 1501 in which the selected area $sr_A$ is represented as white, which is acquired based on the binary image data 1203 in which the subject area $r_A$ is represented as white and the binary image data 1403 in which the low specular reflection area $g_m r$ is represented as white, is illustrated. Furthermore, in FIG. 15B, an example of binary image data 1502 in which the selected area $sr_B$ is represented as white, which is acquired based on the binary image data 1204 in which the subject area $r_B$ is represented as white and the binary image data 1403 in which the low specular reflection area $g_m r$ is represented as white, is illustrated.

Figure 16:
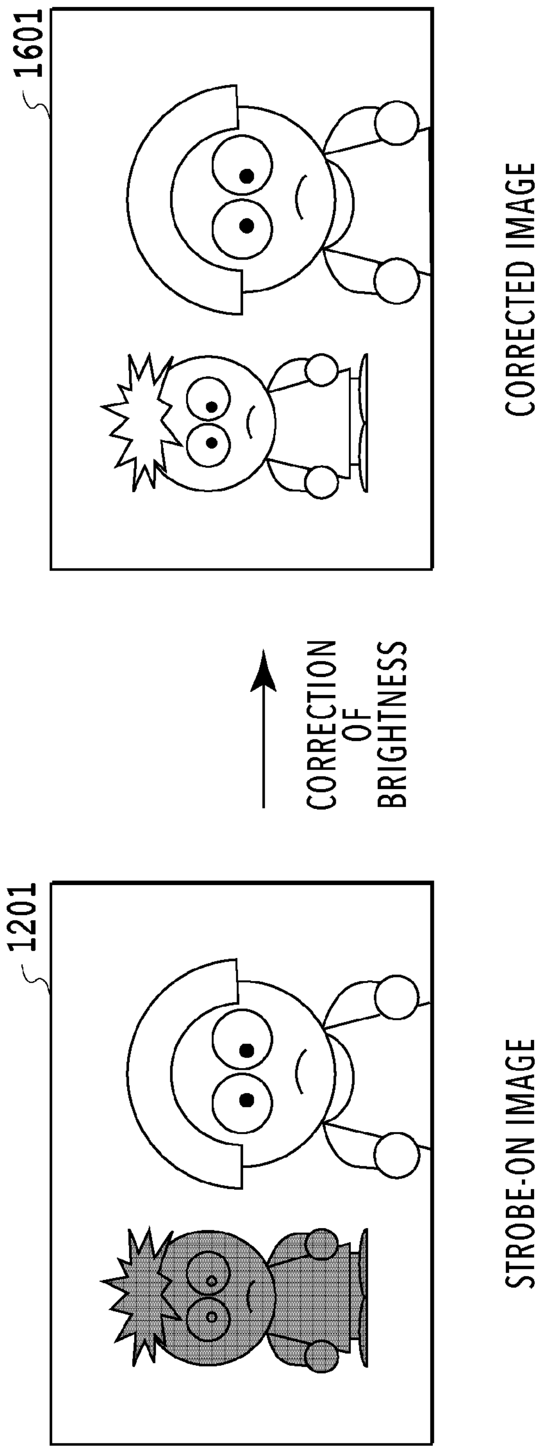
FIG. 16 is a diagram illustrating an overview of the correction process according to the second embodiment.

Through the above processing, it is possible to select the low specular reflection area $g_m r$ of the subject areas $r_A$ and $r_B$ in the strobe-ON image data 1201, based on the specular reflection characteristic information of the subjects, that is, based on the binary image data 1501 and 1502. In FIG. 16, an example of corrected image data 1601 of which the brightness of a subject has been corrected based on the selected areas $sr_A$ and $sr_B$ as described above is illustrated.

As described above, with the image processing device according to an embodiment of the present disclosure, it is possible to appropriately correct brightness of each subject according to the distance to the subject even for glossy subjects, based on reflection characteristic information of the subjects.

Figure 12C:
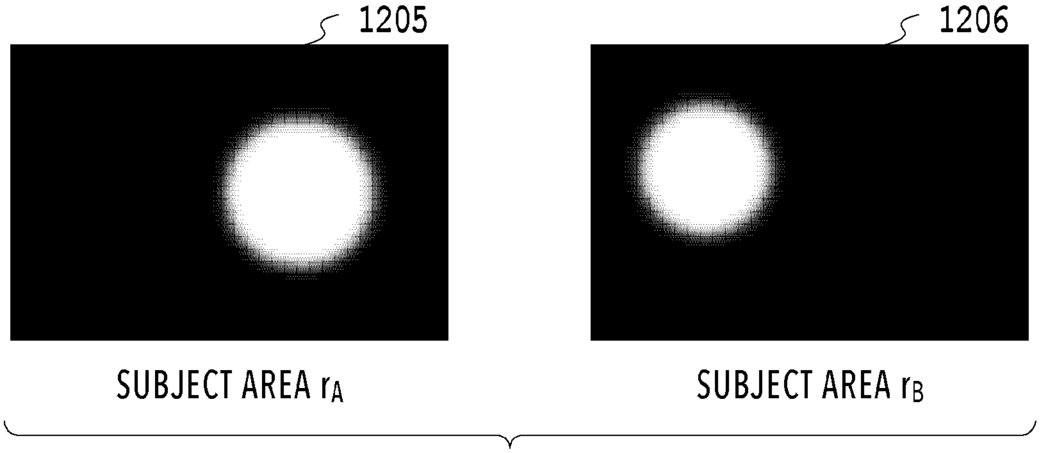
FIG. 12C is a diagram illustrating an example of subject areas according to the second embodiment.

Note that, as for the setting of subject areas, it is also possible that the image processing unit 208 sets appropriate areas based on a face detection result. For example, as illustrated in FIG. 12C, appropriate circular areas that are set according to facial organs based on face information can be set as the subject areas $r_A$ and $r_B$. Alternatively, as in the first embodiment, subject areas can be selected based on a user input.

In addition, although only the low specular reflection area $g_m r$ is set as the selected area sr in the area selection process of the present embodiment, it is also possible that the high-luminance low-saturation area $g_{ls} r$ used in the first embodiment is included for the selected area sr. In this case, in the feature amount acquisition process, the high-luminance low-saturation area $g_{ls} r$ is acquired in the same method as in the first embodiment, in addition to the low specular reflection area $g_m r$. Then, in the area selection process, the pixels included in the subject area r and the low specular reflection area $g_m r$ and not included in the high-luminance low-saturation area $g_{ls} r$ can be set as the selected area sr.

Third Embodiment

In the above-described embodiments, the selected areas $sr_A$ and $sr_B$ are extracted from the subject areas $r_A$ and $r_B$, based on gloss information or reflection characteristic information acquired as a feature amount. On the other hand, in the present embodiment, a selected area is extracted from a subject area, based on shape information of a subject, which is acquired as a feature amount.

In the above embodiments, the ratio ω between the brightness of the ambient light and the strobe light is estimated according to Expression 4. However, in those methods, the influence of shadows based on the shape of a subject is not considered. Regarding a surface that is not facing the image capturing apparatus 101, the amount of light that is reflected from such a surface and is incident on the optical unit 102 decreases, which results in occurrence of a shadow. Therefore, in a case where a subject has many surfaces that are not facing the image capturing apparatus 101, which results in occurrence of many shadows, the estimation accuracy of the ratio ω between the brightness of the ambient light and the strobe light deteriorates.

Therefore, in the present embodiment, by use of shape information of a subject, an area facing a position close to the front face of the image capturing apparatus 101, that is, an area of which the angles between the normal lines of the subject surface and the image capturing direction of the image capturing apparatus 101 are within a predetermined range, is selected. As a result, it is possible to inhibit deterioration in the estimation accuracy cause by a shadow occurring according to the shape of a subject. The present embodiment is different from the second embodiment in the aspects of the feature amount acquisition process performed by the feature amount acquiring unit 302 in S402 and the area selection process performed by the area selecting unit 303 in S403 are different. Hereinafter, an explanation is given of each process.

Feature Amount Acquisition Process in the Third Embodiment

Figure 17:
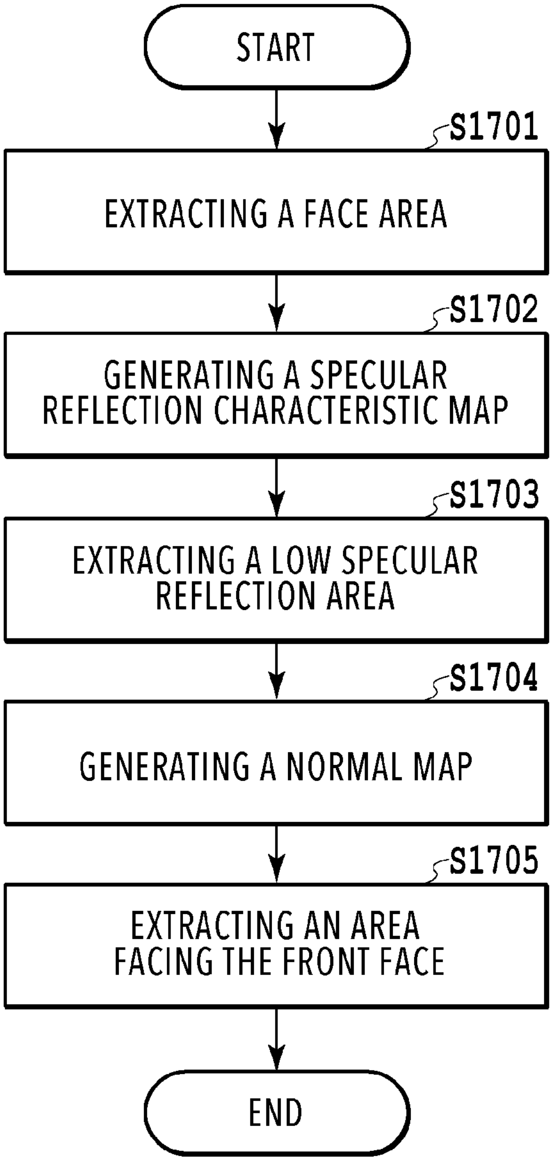
FIG. 17 is a diagram illustrating a flow of the feature amount acquisition process according to the third embodiment.

Here, an explanation is given of the feature amount acquisition process performed by the feature amount acquiring unit 302 in S402 in the present embodiment. In the feature amount acquisition process in the present embodiment, a low specular reflection area $g_m r$ of a subject and a front-face area fr are acquired, based on face information in the strobe-ON image data 1201. In FIG. 17, a procedure of the feature amount acquisition process in the third embodiment is illustrated. Note that, since S1701 through S1703 are the same as S1301 through S1303, which are explained in the second embodiment, explanations thereof are to be omitted.

In S1704, a normal map corresponding to the strobe-ON image data 1201 is generated, based on the face information of each subject acquired by the feature amount acquiring unit 302 in S1701. In the present embodiment, a face normal template that is generated in advance based on the three-dimensional shape of a model face is applied to faces in the strobe-ON image data 1201, in order to generate a normal map corresponding to each subject.

Figure 18A:
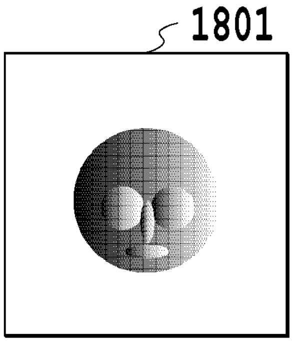
FIG. 18A is a diagram illustrating an overview of the feature amount acquisition process according to the third embodiment.
Figure 18B:
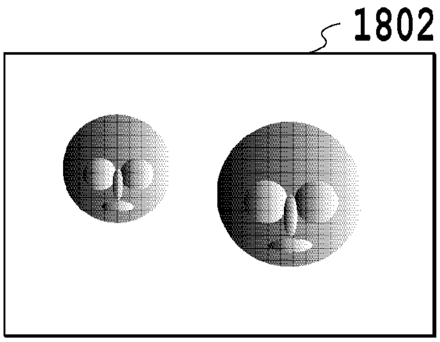
FIG. 18B is a diagram illustrating an overview of the feature amount acquisition process according to the third embodiment.

In FIGS. 18A and 18B, an example of the face normal template 1801 and the normal map 1802 is illustrated. The face normal template is image data including pixels configuring a two-dimensional shape of a face corresponding to the appearance of a three-dimensional shape of a model face viewed from a predetermined position. In the image data of the present face normal template, each pixel configuring the face has a pixel value including a normal vector of the position that is on the three-dimensional shape of the face and corresponding to the pixel. Furthermore, it is assumed that the position information of facial organs such as eyes, a nose, and a mouth is held in the face normal template.

In the present step S1704, first, the position information of the facial organs of each subject included in the strobe-ON image data 1201 is associated with the position information of the corresponding facial organs in the face normal template 1801. Next, based on the associated position information, transformation parameters for transforming the face normal template 1801 into a shape corresponding to the face image of each subject included in the strobe-ON image data 1201 is calculated. As the transformation parameters, a projective transformation parameter, an affine transformation parameter, or the like can be utilized. Then, based on the calculated transformation parameters, the face normal template 1801 is transformed so as to correspond to the shape of the face image in each subject, and the face normal template 1801 corresponding to each subject is combined, in order to generate the normal map 1802.

Figure 18C:
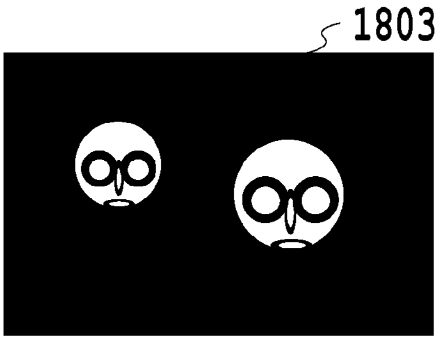
FIG. 18C is a diagram illustrating an overview of the feature amount acquisition process according to the third embodiment.

In S1705, for each subject, the feature amount acquiring unit 302 extracts a front-face area fr, which has a normal vector indicative of a direction to a position that is close to the front face of the image capturing apparatus 101, based on the corresponding normal map 1802. Specifically, pixels of which the inner product of the optical axis vector of the optical unit 102, which is in the image capturing direction of the image capturing apparatus 101, and the normal vector of the pixel in the normal map is equal to or greater than a threshold value are extracted as the front-face area fr. In FIG. 18C, an example of binary image data 1803 in which the extracted front-face area fr is represented as white is illustrated.

Area Selection Process in the Third Embodiment

Figure 19:
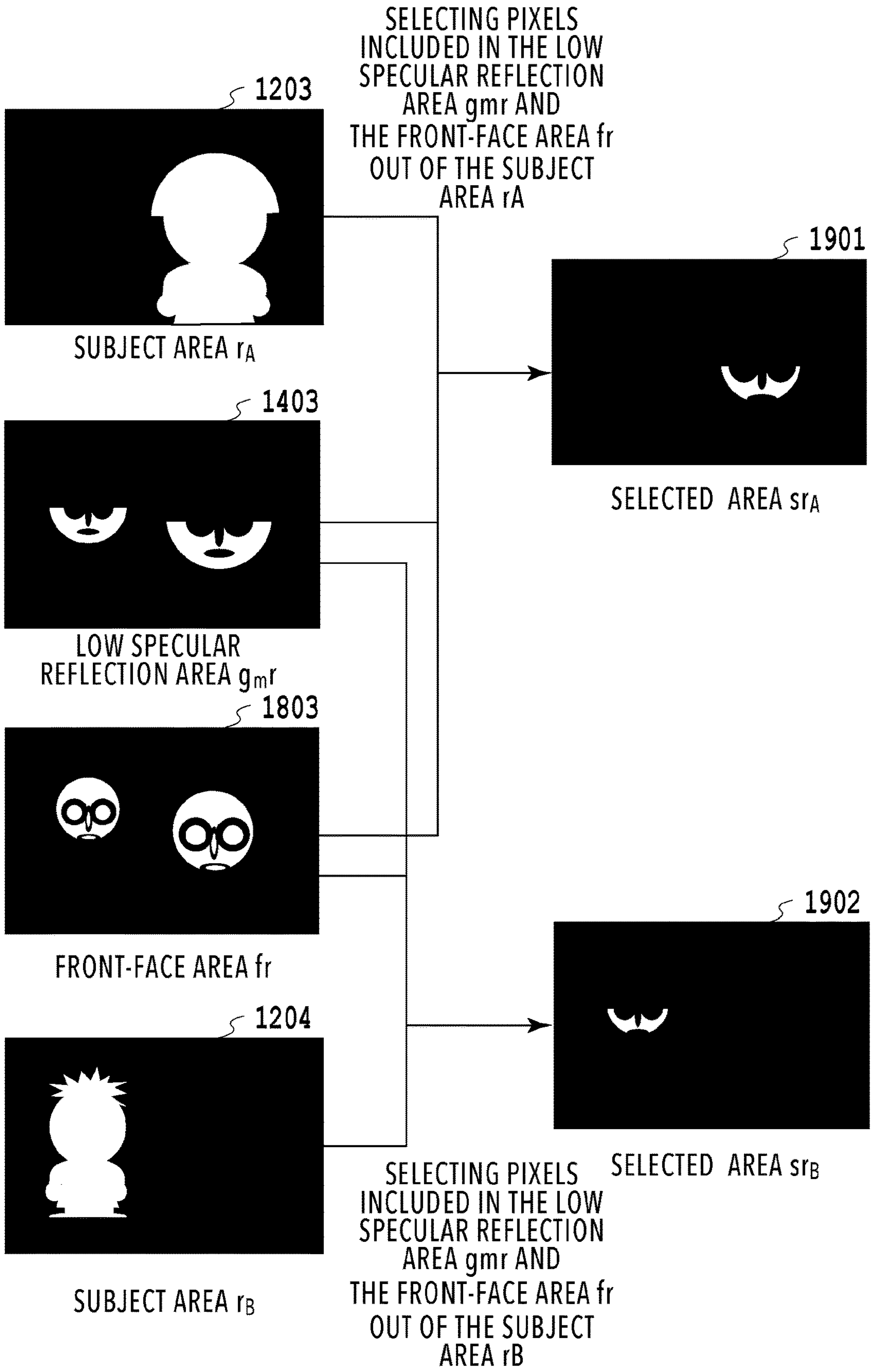
FIG. 19 is a diagram illustrating an overview of the area selection process according to the third embodiment.

Here, an explanation is given of the area selection process performed by the area selecting unit 303 in S403 in the present embodiment. In the area selection process of the present embodiment, based on the binary image data 1403 of the low specular reflection area $g_m r$ and the binary image data 1803 of the front-face area fr, the pixels included in the low specular reflection area $g_m r$ and the front-face area fr of the respective subject areas $r_A$ and $r_B$ are set as the selected areas $sr_A$ and $sr_B$. In FIG. 19, an example of binary image data 1901 in which the selected area $sr_A$ is represented as white, which is acquired based on the binary image data 1203 of the subject area $r_A$, the binary image data 1403 of the low specular reflection area $g_m r$, and the binary image data 1803 of the front-face area fr, is illustrated. Furthermore, in FIG. 19, an example of binary image data 1902 in which the selected area $sr_B$ is represented as white, which is acquired based on the binary image data 1204 of the subject area $r_B$, the binary image data 1403 of the low specular reflection area $g_m r$, and the binary image data 1803 of the front-face area fr, is illustrated.

Note that, although only one face normal template 1801 is prepared in the present embodiment, it is also possible that multiple face normal templates 1801 having different face directions are prepared. In this case, in S1704, a face normal template 1801 that matches the direction of the face of the subject can be selected. As a method for selection, for example, the values of the difference generated when the transformation parameters are calculated based on the position information of the facial organs are calculated by use of the respective face normal templates 1801, and the one having the smallest difference can be selected. Alternatively, it is also possible to estimate the direction of a face, based on the coordinates of the facial organs of the subject, and the face normal template 1801 whose direction is the closest to the direction of the face is selected.

In addition, although the face normal template 1801 is utilized for acquiring the normal information in the present embodiment, it is also possible that a three-dimensional shape of a face is matched based on the position information of the facial organs of a subject, in order to acquire normal information from the matched three-dimensional shape.

As described above, with the image processing device according to an embodiment of the present disclosure, it is possible to appropriately correct brightness of each subject according to the distance to the subject even for glossy subjects, based on reflection characteristic information of the subjects.

Fourth Embodiment

In the above-described embodiments, the explanations are given on the assumption that there is no misalignment of subjects between the strobe-ON image data 1201 and the strobe-OFF image data 1202. However, in a case of actually capturing an image, it is possible that the position of a subject shifts between the strobe-ON image data 1201 and the strobe-OFF image data 1202 due to shake of the image capturing apparatus 101, a motion of the subject, or the like. In the auxiliary light arrival rate estimation process of the present embodiment, positioning of the strobe-ON image data 1201 and the strobe-OFF image data 1202 is performed based on the selected areas $sr_A$ and $sr_B$, so as to inhibit the influence of misalignment of the subjects. The present embodiment is different from the above embodiments in the aspect of the auxiliary light arrival rate estimation process performed by the auxiliary light arrival rate estimating unit 304 in S404. Hereinafter, an explanation is given of the auxiliary light arrival rate estimation process in the present embodiment.

Auxiliary Light Arrival Rate Estimation Process in the Fourth Embodiment

Figure 20:
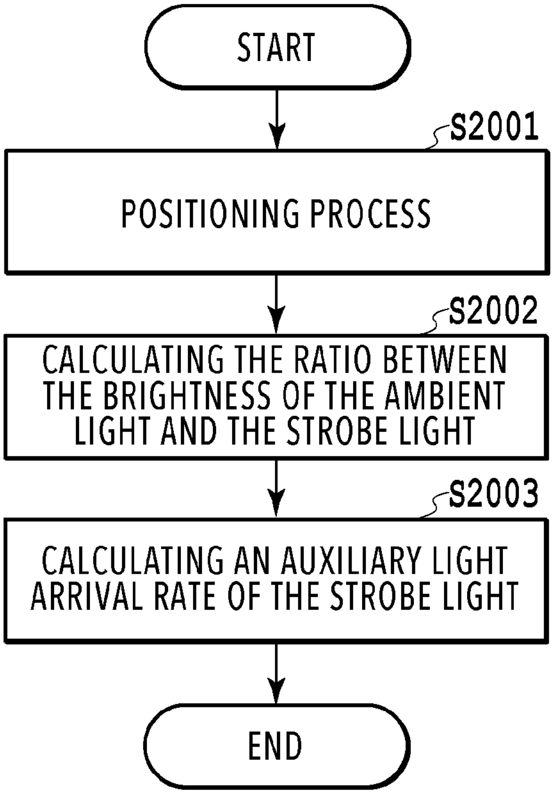
FIG. 20 is a diagram illustrating a flow of the auxiliary light arrival rate estimation process according to the fourth embodiment.

Here, an explanation is given of the auxiliary light arrival rate estimation process performed by the auxiliary light arrival rate estimating unit 304 in S404 of the present embodiment. In FIG. 20, a procedure of the auxiliary light arrival rate estimation process in the fourth embodiment is illustrated. In the auxiliary light arrival rate estimation process of the present embodiment, first, positioning of strobe-ON image data and strobe-OFF image data is performed in S2001. Thereafter, in S2002 and S2003, the auxiliary light arrival rate $\alpha(x)$ of the strobe light emitted from the strobe 104 at the distance between each subject and the image capturing apparatus 101 is estimated by the same processes as in S901 and S902 of the first embodiment. Hereinafter, explanations of S2002 and S2003 are omitted, and only the process of S2001 is to be described.

Figure 21:
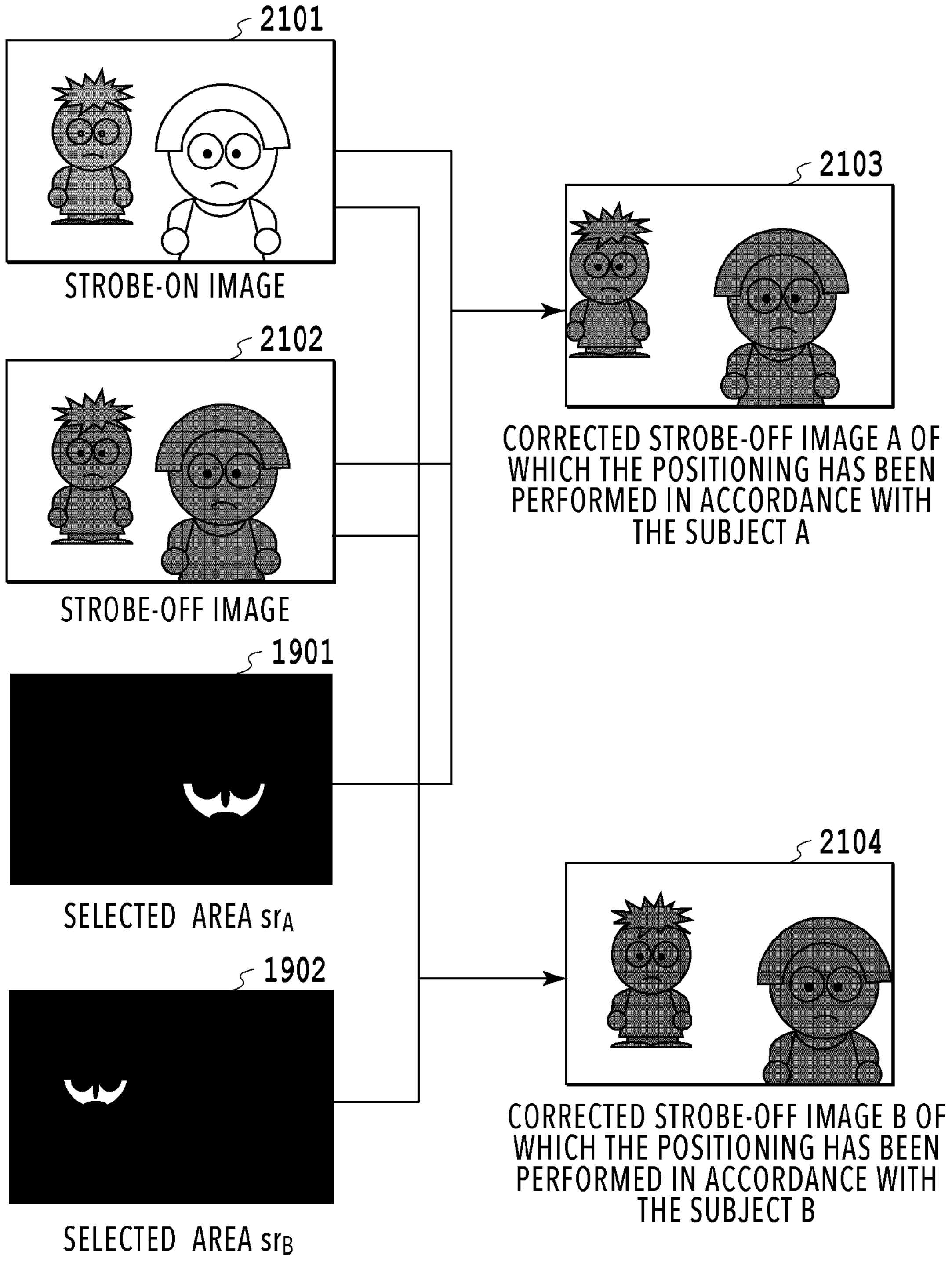
FIG. 21 is a diagram illustrating an overview of a positioning process according to the fourth embodiment.

FIG. 21 is a diagram illustrating an overview of the positioning process in S2001. In the present step, positioning of the strobe-ON image data 2101 and the strobe-OFF image data 2102, in which there is misalignment of a subject, is performed for each subject, based on the selected areas $sr_A$ and $sr_B$ of the respective subjects. Here, the positioning is performed such that the vicinities of the selected areas $sr_A$ and $sr_B$ of the respective subjects are preferentially matched.

As the positioning process, for example, it is possible to utilize template matching based on edge information, a geometrical conversion process based on correspondence of characteristic points such as edges or corners, and the like. In a case of utilizing template matching based on edge information, firstly, edge extraction is respectively performed on the strobe-ON image data 2101 and the strobe-OFF image data 2102 by use of a high-pass filter or the like. Then, the edges of the strobe-ON image data 2101 are weighted, based on the distance from the selected areas $sr_A$ and $sr_B$, and the strobe-ON image data 2101 with the weighted edges is used as a template. Here, the farther the distance from the selected areas $sr_A$ and $sr_B$ is, the lighter the weight becomes.

By use of this template, matching with edges of the strobe-OFF image data 2102 is performed, in order to calculate the amount of misalignment of the subjects between the strobe-ON image data 2101 and the strobe-OFF image data 2102. Then, the strobe-OFF image data 2102 is corrected to a position in which the calculated amount of misalignment becomes the minimum, so as to generate corrected strobe-OFF image data. Since an edge with a light weight has a small influence in the matching process, the positioning of the selected areas $sr_A$ and $sr_B$, which have large weights, can be preferentially performed.

In FIG. 21, an example of corrected strobe-OFF image data 2103 of which the misalignment has been corrected in accordance with the subject A and corrected strobe-OFF image data 2104 of which the misalignment has been corrected in accordance with the subject B is illustrated.

In the following processes, the auxiliary light arrival rate is estimated by use of the strobe-ON image data 2101 and the corrected strobe-OFF image data 2103 and 2104. That is, the corrected strobe-OFF image data 2103 is used as the strobe-OFF image data for the auxiliary light arrival rate estimation process performed on the subject A. Further, the corrected strobe-OFF image data 2104 is used as the strobe-OFF image data for the auxiliary light arrival rate estimation process performed on the subject B. As a result, it is possible to inhibit estimation errors caused by misalignment of subjects.

As described above, with the image processing device according to an embodiment of the present disclosure, it is possible to appropriately correct brightness of a subject according to the distance to the subject, based on reflection characteristic information, even in a case where there is misalignment between subjects in strobe-ON image data and strobe-OFF image data.

Note that, although correction is performed on the strobe-ON image data in the above-described embodiment, it is also possible that correction is performed on the strobe-OFF image data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

With the technology of the present disclosure, it is possible to appropriately correct the brightness of a subject according to the distance to the subject in consideration of a reflection characteristic of the subject.

This application claims the benefit of Japanese Patent Application No. 2019-165644 filed Sep. 11, 2019, which is hereby incorporated by reference wherein in its entirety.

What is claimed is:

1. An image processing device comprising:

a processor; and a memory, including instructions stored thereon, which when executed by the processor cause the image processing device to:

acquire first image data, which is acquired by image-capturing with an auxiliary light turned on, and second image data, which is acquired by image-capturing without turning on the auxiliary light, for a same scene;

set a plurality of subject areas corresponding to a plurality of subjects in the first image data or the second image data;

select a selected area from each of the plurality of subject areas, based on a feature amount related to a reflection characteristic of each of the plurality of subject areas; and correct a pixel value of each of the plurality of subject areas of the first image data or the second image data, based on a pixel value of the selected area in the first image data and the second image data.

2. The image processing device according to claim 1, wherein the instructions when executed further cause the image processing device to:

correct the pixel value of each of the plurality of subject areas, based on a correction coefficient that changes according to a distance between a light source of the auxiliary light and each of the plurality of subjects.

3. The image processing device according to claim 1, wherein the instructions when executed further cause the image processing device to:

acquire a ratio between brightness of pixel values of corresponding selected areas in the first image data and the second image data, so as to correct the pixel value of each of the plurality of subject areas such that difference in the ratio between brightness is decreased between the plurality of subject areas.

4. The image processing device according to claim 3, wherein the instructions when executed further cause the image processing device to:

correct the pixel values of each of the plurality of subject areas such that the ratio between brightness of the pixel value becomes closer to the ratio between brightness of the plurality of subject areas.

5. The image processing device according to claim 1, wherein the instructions when executed further cause the image processing device to:

use intensity of gloss in each of the plurality of subjects as the feature amount, so that, out of the plurality of subject areas, an area is selected of which the intensity of the gloss is equal to or lower than a predetermined threshold value as the selected area.

6. The image processing device according to claim 5, wherein the instructions when executed further cause the image processing device to:

use a luminance value and a saturation value of each of the plurality of subjects as the feature amount, so that, as the selected area, an area formed by a pixel value of which the luminance value is equal to or greater than a first threshold value and the saturation value is equal to or lower than a second threshold value is selected.

7. The image processing device according to claim 5, wherein the instructions when executed further cause the image processing device to:

use a specular reflectance of each of the plurality of subjects as the feature amount, so that, as the selected area, an area formed by a pixel value of which the specular reflectance is equal to or lower than a second predetermined threshold value is selected.

8. The image processing device according to claim 7, wherein a specular reflection characteristic template having a pixel value indicative of a specular reflectance corresponding to at least a part of a shape of each of the plurality of subjects, so as to acquire the specular reflectance of each of the plurality of subjects by applying the specular reflectance characteristic template to at least a part of each of the plurality of subjects in the first image data or the second image data.

9. The image processing device according to claim 1, wherein the instructions when executed further cause the image processing device to:

use normal information of the plurality of subjects as the feature amount, so that, as the selected area, an area of which an angle between a normal of a surface of each of the plurality of subjects and an image-capturing direction of the first image data and the second image data is within a predetermined range is selected.

10. The image processing device according to claim 9, wherein a normal template having a pixel value indicative of normal information corresponding to at least a part of a shape of each of the plurality pf subjects, so as to acquire normal information of each of the plurality of subjects by applying the normal template to at least a part of each of the plurality of subjects in the first image data or the second image data.

11. The image processing device according to claim 1, wherein the instructions when executed further cause the image processing device to:

perform positioning of the selected area of the first image data and the selected area of the second image data corresponding thereto; and correct the pixel value of each of the plurality of subject areas, based on a second pixel value of the selected areas to which the positioning has been performed.

12. The image processing device according to claim 1, wherein the instructions when executed further cause the image processing device to:

acquire distance information related to a distance to each of the plurality of subjects; and set the plurality of subject areas, based on the distance information.

13. The image processing device according to claim 1, wherein the instructions when executed further cause the image processing device to:

detect a specific shape of each of the plurality of subjects and sets an area including the detected specific shape as each of the plurality of subject areas.

14. An image processing method comprising:

acquiring first image data, which is acquired by image-capturing with an auxiliary light turned on with a first brightness, and second image data, which is acquired by image-capturing with the auxiliary light turned on with a second brightness that is different from the first brightness, for a same scene;

setting a plurality of subject areas in the first image data or the second image data;

selecting a selected area from each of the plurality of subject areas, based on a feature amount related to a reflection characteristic of each of the plurality of subject areas; and correcting a pixel value of each of the plurality of subject areas of the first image data or the second image data, based on a pixel value of the selected area in the first image data and the second image data.

15. The image processing method according to claim 14, wherein the pixel value of each of the plurality of subject areas is corrected, based on a correction coefficient that changes according to a distance between a light source of the auxiliary light and each of the plurality of subjects.

16. The image processing method according to claim 14, wherein a ratio between brightness of pixel values of corresponding selected areas in the first image data and the second image data is acquired, so as to correct the pixel value of each of the plurality of subject areas such that difference in the ratio between brightness is decreased between the plurality of subject areas.

17. The image processing method according to claim 16, wherein the pixel values of each of the plurality of subject areas is corrected such that the ratio between brightness of the pixel value becomes closer to the ratio between brightness of the plurality of subject areas.

18. The image processing method according to claim 14, wherein intensity of gloss in each of the plurality of subjects is used as the feature amount, so that, out of the plurality of subject areas, an area of which the intensity of the gloss is equal to or lower than a predetermined threshold value is selected as the selected area.

19. The image processing method according to claim 18, wherein a luminance value and a saturation value of each of the plurality of subjects are used as the feature amount, so that, as the selected area, an area formed by a pixel value of which the luminance value is equal to or greater than a first threshold value and the saturation value is equal to or lower than a second threshold value is selected.

20. A non-transitory computer readable storage medium storing a program that causes a computer to execute an image processing method, the image processing method comprising:

acquiring first image data, which is acquired by image-capturing with an auxiliary light turned on with a first brightness, and second image data, which is acquired by image-capturing with the auxiliary light turned on with a second brightness that is different from the first brightness, for a same scene;

setting a plurality of subject areas in the first image data or the second image data;

selecting a selected area from each of the plurality of subject areas, based on a feature amount related to a reflection characteristic of each of the plurality of subject areas; and correcting a pixel value of each of the plurality of subject areas of the first image data or the second image data, based on a pixel value of the selected area in the first image data and the second image data.

* * * * *